US010732962B1

(12) United States Patent
Florescu

(10) Patent No.: US 10,732,962 B1
(45) Date of Patent: Aug. 4, 2020

(54) END-TO-END DEPLOYMENT INFRASTRUCTURE

(71) Applicant: Amazon Technologies, Inc., Seattle, WA (US)

(72) Inventor: Dan-Constantin Florescu, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/017,113

(22) Filed: Jun. 25, 2018

Related U.S. Application Data

(60) Provisional application No. 62/656,635, filed on Apr. 12, 2018.

(51) Int. Cl.
| | | |
|---|---|---|
| *G06F 8/656* | (2018.01) | |
| *G06F 8/71* | (2018.01) | |
| *G06F 9/54* | (2006.01) | |
| *G06F 11/30* | (2006.01) | |
| *G06F 11/36* | (2006.01) | |

(52) U.S. Cl.
CPC ............... *G06F 8/656* (2018.02); *G06F 8/71* (2013.01); *G06F 9/544* (2013.01); *G06F 11/302* (2013.01); *G06F 11/3051* (2013.01); *G06F 11/3616* (2013.01)

(58) Field of Classification Search
CPC . G06F 8/656; G06F 8/71; G06F 9/544; G06F 11/3616; G06F 11/3051; G06F 11/302
See application file for complete search history.

(56) References Cited

U.S. PATENT DOCUMENTS

| | | | |
|---|---|---|---|
| 9,058,211 B2 | 6/2015 | Joanny et al. | |
| 9,596,244 B1 | 3/2017 | Kozolchyk et al. | |
| 9,612,821 B2 * | 4/2017 | Iyer | ............................ G06F 8/60 |
| 9,760,366 B2 * | 9/2017 | Frank | ..................... G06F 16/173 |
| 9,787,779 B2 * | 10/2017 | Frank | ......................... G06F 8/65 |
| 9,910,654 B1 * | 3/2018 | Brigham, II | ............... G06F 8/61 |
| 10,057,246 B1 | 8/2018 | Drozd et al. | |

(Continued)

OTHER PUBLICATIONS

Sundbaum, "Automated Verification of Load Test Results in a Continuous Delivery Deployment Pipeline", Jun. 2015, KTH Royal Institute of Technology (Year: 2015).*

(Continued)

*Primary Examiner* — Wei Y Zhen
*Assistant Examiner* — Junchun Wu
(74) *Attorney, Agent, or Firm* — Davis Wright Tremaine LLP

(57) ABSTRACT

Systems and methods as described herein may relate to the use of card pipelines in the deployment of a service and/or library change. Cards may, for example, include code and/or run-time systems that utilize the service/library component. A system such as a release controller may detect a change to a service/library component that is utilized by a plurality of cards, trigger a card pipeline to cause the execution of one or more tests, and if a test failure is attributable to the change to the service component, halt the deployment of the card pipeline, a second card pipeline (e.g., being deployed and/or tested in parallel). The order in which the card pipelines are exercised may be determined based on card quality scores generated based on quality metrics collected in association with operation of the cards over time.

19 Claims, 12 Drawing Sheets

(56) References Cited

U.S. PATENT DOCUMENTS

| | | | |
|---|---|---|---|
| 10,191,778 B1 | 1/2019 | Yang et al. | |
| 10,318,285 B1* | 6/2019 | Jodoin | G06F 8/40 |
| 2006/0123389 A1* | 6/2006 | Kolawa | G06F 11/3616 |
| | | | 717/124 |
| 2007/0055959 A1* | 3/2007 | Eckardt | G06F 8/71 |
| | | | 717/126 |
| 2009/0049285 A1 | 2/2009 | Kurosawa | |
| 2011/0239048 A1* | 9/2011 | Andrade | G06F 11/3616 |
| | | | 714/35 |
| 2013/0318503 A1* | 11/2013 | Li | G06F 9/45529 |
| | | | 717/126 |
| 2014/0173561 A1* | 6/2014 | Toub | G06F 8/73 |
| | | | 717/123 |
| 2015/0220426 A1* | 8/2015 | Spektor | G06F 11/36 |
| | | | 717/131 |
| 2015/0334696 A1 | 11/2015 | Gu et al. | |
| 2016/0092203 A1 | 3/2016 | Filali-Adib et al. | |
| 2017/0046409 A1 | 2/2017 | Bender | |
| 2017/0054598 A1 | 2/2017 | Adam et al. | |
| 2017/0142024 A1 | 5/2017 | Fromentoux et al. | |
| 2017/0155560 A1 | 6/2017 | Lee et al. | |
| 2017/0177324 A1* | 6/2017 | Frank | G06F 16/173 |
| 2017/0228312 A1* | 8/2017 | Shani | G06F 11/3688 |
| 2017/0235662 A1* | 8/2017 | Leask | G06F 11/3616 |
| | | | 717/125 |
| 2017/0337124 A1* | 11/2017 | Maag | G06F 11/3692 |
| 2018/0173502 A1 | 6/2018 | Biskup et al. | |
| 2018/0203744 A1 | 7/2018 | Wiesmaier et al. | |
| 2019/0028336 A1 | 1/2019 | Coronado et al. | |
| 2019/0129701 A1* | 5/2019 | Hawrylo | G06F 8/61 |
| 2019/0138288 A1* | 5/2019 | Brealey | G06F 8/65 |
| 2019/0158593 A1 | 5/2019 | Sloane et al. | |
| 2019/0294536 A1* | 9/2019 | Avisror | G06F 8/60 |

OTHER PUBLICATIONS

Soni, "End to End Automation on Cloud with Build Pipeline: The case for DevOps in Insurance Industry", 2016, IEEE (Year: 2016).*

Mishra et al., "Graph-based Functional Test Program Generation for Pipelined Processors", 2004, IEEE (Year: 2004).*

Bass et al., "Securing a Deployment Pipeline", 2015, NICTA (Year: 2015).*

Syrivelis et al., "Supporting Multitasking of Pipelined Computations on Embedded Parallel Processor Arrays", 2009, IEEE (Year: 2009).*

* cited by examiner

US 10,732,962 B1

END-TO-END DEPLOYMENT INFRASTRUCTURE

CROSS-REFERENCE TO RELATED APPLICATION

This application claims benefit of U.S. Provisional Application No. 62/656,635, filed Apr. 12, 2018, entitled "END-TO-END DEPLOYMENT INFRASTRUCTURE," the disclosure of which is hereby incorporated herein in its entirety.

BACKGROUND

A deployment may refer to a set of operations that replaces one version of software with a newer version according to a release recipe. A deployment may be responsible for delivering updates to software to improve aspects such as latency, hardware cost, fix bugs, and more. Software may be deployed according to a schedule according to a product life-cycle. In many cases, software involved in a deployment is owned by multiple entities, such as service and library teams.

Service and library teams may not be empowered to control their product life-cycles, and these teams may be deprived of the gradual release and the rollback control, monitoring, and deprecation of software. In some cases, these challenges exist because of the mixing of ownership responsibilities. Customers of a service may own the release and the deprecation of binaries that do not belong to them. Often, this is tolerated because service and library teams are known to understand the backwards compatibility and are capable of addressing it on a centralized manner. However, on the other side, each client can pose a compatibility risk. Accordingly, there is a desire to enable contributing teams and library teams to re-gain some ownership into the client releases.

BRIEF DESCRIPTION OF THE DRAWINGS

Various techniques will be described with reference to the drawings, in which.

DETAILED DESCRIPTION

Figure 1:
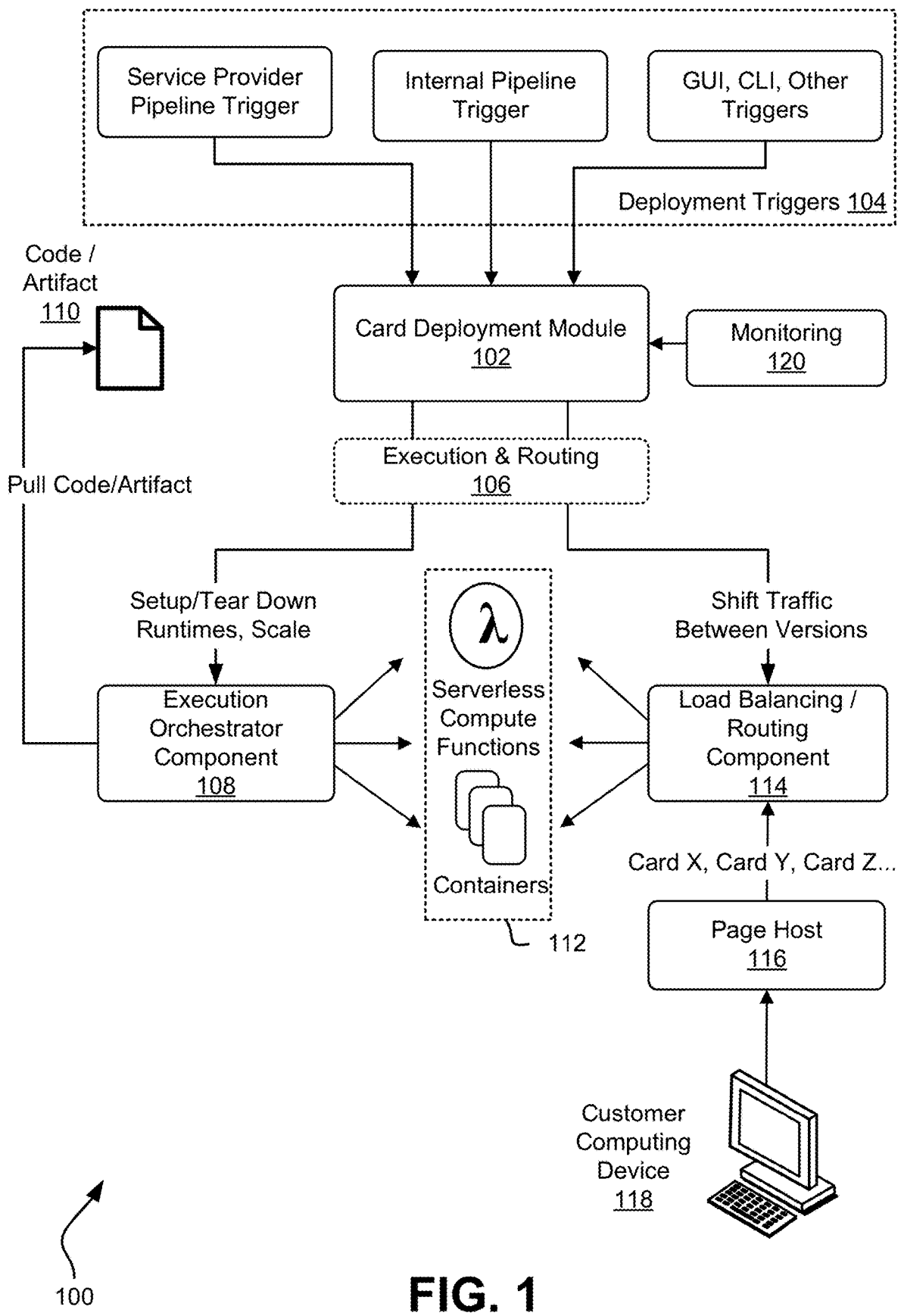
FIG. 1 illustrates a computing environment in which a card deployment mechanism can be triggered using service provider pipeline triggers, internal pipeline triggers, and manual triggers such as those exposed through graphical user interfaces, command line interfaces, and more, according to at least one embodiment.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Methods and systems described in this disclosure may be utilized to enable pipelines to be used in the end-to-end deployment of source code. The pipelines may be used to deploy containers to various hosting and routing solutions, such as a stack service. The deployment may be responsible for delivering updates to existing code (e.g., an existing card), updates to code configuration, re-running an activation process, or any combination thereof. Utilizing a deployment process can provide various advantages to the operation of computer systems, such as improved latency, reduced hardware costs, improved reliability of the operation of software (e.g., by applying bug fixes or security patches).

Cards may refer to individual units of source code and a corresponding run-time execution that are used to implement a particular user experience such as a remote widget, a page slot, a twister controller, a buy-box area, and more. For example, a webpage may include multiple cards that are each owned, authored, tested, and deployed independently by different teams of software developers. A card pipeline, as described hereinbelow in greater detail, may refer to computing resources that are used for the end-to-end deployment of cards, which may include provisioning computing resources according to a production environment (e.g., with updated cards code generated by a developer team)—but not necessarily also configuring a routing layer to route customer requests to the provisioned resources—accessing the resources via a private endpoint to validate the state of the computing environment, such as by performing unit tests, smoke tests, providing a 'baking period' to identify whether abnormal behavior arises after a certain period of time (e.g., memory leaks), and performing a gradual roll-out of the updated card to process production traffic.

As described throughout this document, an end-to-end deployment pipeline may be utilized to implement deployment of cards, which may be independent units of deployment, meaning that deployments that target fixes or tweaks that have no questionable business impact become a viable alternative to deployments tied to software and hardware monitoring that can take hours to perform. It should be noted and appreciated by one of ordinary skill in the art that the deployment of cards using the end-to-end pipelines infrastructure as described herein is merely one example of how the disclosed systems and methods may be utilized, and more generally, techniques described herein pertain to end-to-end deployment solutions for code that is not necessarily tied to card deployments.

FIG. 1 illustrates a computing environment 100 in which various embodiments may be practiced. The computing environment 100 may be utilized to enable pipelines to be used in the end-to-end deployment of source code. The pipelines may be used to deploy containers to various execution (e.g., hosting) and routing solutions, such as a stack service. The deployment may be responsible for delivering updates to existing code (e.g., an existing card), updates to code configuration, re-running an activation process, or any combination thereof.

A card may refer to a back-end and front-end piece of an experience, such as that of a website. For example, a card may refer to a remote widget, a page slot, a twister controller, a buy-box area, or a product title. In some embodiments, a card comprises code written in an interpreted or compiled programming language. The card may, for example, include a script written in a programming language such as JavaScript, TypeScript, Dart, and more. These are non-limiting examples of cards. Cards can be authored and released independently. Cards may be deployed using the infrastructure described in FIG. 1. While the deployment of cards is described in connection with various embodiments of this disclosure (e.g., FIG. 1), systems and methods described herein may be utilized, more generally, in the context of other types of computing resources such as in the context of deploying source code, executable code, and more.

The card deployment module 102 illustrated in FIG. 1 may be implemented as hardware, software, or a combination thereof. The card deployment module may be a software library such as a dynamically linked library, statically linked library of an executable file. The card deployment module 102 may be implemented as one or more computer applications that include executable code that, if executed by one or more processors of a computer system, cause the computer system to deploy containers on execution (e.g., hosting) and routing solutions such as those illustrated in FIG. 1 and described in accordance with various embodiments and figures described throughout this disclosure. The card deployment module 102 may be software (e.g., in the form of a plugin, application, be utilized as a deployment solution that enables card pipelines to deploy containers on execution (e.g., hosting) and routing solutions such as a stack service or other execution (e.g., hosting) and routing solutions that are provided by a computing resource service provider. The deployment solution 112 may be a container and/or serverless compute deployment solution that enables the deployment of a card pipeline on stack service. Cards may be provisioned, configured, or otherwise conceived of as containers (e.g., Docker containers, the product developed by Docker, Inc.) but can also be serverless compute functions that are executed in a run-time environment. For example, a serverless function may be executed on an open-source, cross-platform run-time environment that executes code (e.g. node.js JavaScript run-time).

A container may refer to a lightweight, stand-alone, executable package of a piece of software that includes everything needed to run it: code, run-time, system tools, system libraries, settings, etc. Containers may be utilized to ensure that software run the same, regardless of the computing environment deployed to. Containers may be used to isolate software from its surroundings, for example differences between development and staging environments and help reduce conflicts between teams running different software on the same infrastructure. In an embodiment, a container running on a physical computing device share that device's operating system kernel; the container is able to start instantly and use less compute and RAM. Images may be constructed from filesystem layers and share common files. Accordingly, containers may be considered lightweight computing resources that minimizes disk usage and image downloads are much faster.

A serverless compute service provider may be utilized to execute serverless compute workflows. A serverless compute service provider may refer to a service provider implemented on a fleet of one or more servers that allow the execution of code (e.g., serverless compute workflow) on behalf of a client of the service provider without requiring the client to setup, reserve, and/or provision compute resources to execute the code. A serverless compute service provider may, as part of the services provides, perform on behalf the client one or more steps involved in identifying available compute resources (e.g., virtual machine instances), determining the amount of computational power to provision, provisioning the compute resources, executing the code, providing a result of the execution, terminating and/or tearing down the compute resources utilized, or any combination thereof. A serverless compute workflow may be analogized, in at least some respects, with a C++ 11 lambda function (also referred to in some contexts as an anonymous function) which is not bound to an identity. In some embodiments, the serverless compute workflow is executed based on detecting the satisfaction of one or more conditions which may be defined by a client of the serverless compute service provider. An example of an event-driver serverless compute service provider in accordance with those described in this disclosure is Amazon Web Services (AWS) Lambda.

The card deployment module 102 can be triggered using various mechanisms. Examples of deployment triggers 104 include: an internal pipeline, a computing resource service provider pipeline (e.g., internal code pipeline or, more generally, any suitable code release orchestrator), or manually using a graphical user interface (GUI) or a command-line interface (CLI). The card deployment module 102 can use a predefined recipe to gradually release new code (e.g., a security patch) and to be able to react by programmatically rolling back if any of the monitors 120 signal an issue. The GUI/CLI can also trigger the rollback based at least in part on a manual action taken by an operator, such as if an engineer detects an issue even earlier than the preset alarms. The card deployment module 102 can be configured to instruct execution (e.g., hosting) and routing components to enable batches of the new code for example 10% every 10 minutes, and it will check if the execution (e.g., hosting) and routing dependencies can keep-up with the deployment pace. After the new code reaches 100%, there can be an extended validation period which enables a very quick rollback in case errors take longer to surface. Validation periods can also exist if the deployment target is for example 2% (in the case of a canary release).

The execution and routing 106 layer may refer to computing resources that are usable to gradually replace a software version with another one (e.g., as part of applying a security update). While the execution and routing 106 layer may be logically and/or physically coupled components, as illustrated in FIG. 1, such need not be the case, and in various embodiments, an execution layer and routing layer are decoupled such that they are operated and accessible as different services in the context of a computing resource service provider. In an embodiment, the stack service refers to an abstraction of either/both of the execution (e.g., hosting) and the routing layers in such a manner that the card deployment module 102 is able to communicate and issue commands to a single endpoint (e.g., a single service). The execution and routing 106 layer can determine both the routing of requests and capacity scaling. In an embodiment, the execution and routing layer 106 includes executable code that, as a result of execution by one or more processors of a computer system, cause the computer system to execute the deployment according to deployment preferences that set the pace, the rollback criteria, etc. In an embodiment, the execution and routing 106 layer supports manual actions such as deployment stop, rollback to last version (or any previous version), speed-up/slow-down of the deployment/rollback, and more.

An execution orchestrator component 108 may refer to a pipeline that is used to orchestrate application code changes so that application code 110 or other types of software artifacts such as data files (e.g., localized strings) can be rolled out (deployed) to a computing environment. In an embodiment, an application pipeline includes capabilities for fully automated code configuration management. In an embodiment, an application pipeline supports one or more of the following capabilities: safely create and update resources configured as code; setup and tear down of runtimes; scaling of computing resources to accommodate execution of the application code; roll back bad code changes; generate deployment status of software resource; and more.

In an embodiment, the execution orchestrator component 108 supports many features that provide value in the context of commercial software such as incremental rollout, testing, rollback, and deployment calendars. In some embodiments, pipelines also provide automation and a consistent, repeatable release process that improves reliability and consistency of commercial software, thereby reducing the chance of errors in production and improves visibility and auditing of changes to various aspects of deployment, such as the deployment of a particular set of computing resources to run application code. In an embodiment, an application pipeline is utilized to control the timing of code changes, ensuring that they can be applied (and rolled back) as an atomic change. In an embodiment, an atomic change may refer to a series of changes that are treated in an "all or nothing" manner such that if any step fails, the entire series of changes is rolled back and the environment is reverted to a state as if none of the steps prior to the atomic change occurred.

A load balancing/routing component 114 may be utilized to shift traffic between different versions of application code that may be deployed across a server fleet. In an embodiment, a code change may be gradually deployed across a fleet (e.g., at first to a single server, and then gradually to the rest of the fleet as quality metrics are used to validate that the change has not caused any adverse impact). The executing and routing layer 106 may be used to specify what portion of customer traffic (e.g., customer requests) is shifted to new code being deployed and what portion remains on the original code that was running on the server fleet prior to the deployment. The card deployment module 102 may specify a percentage of the traffic that should be directed towards a first set of computing resources that runs the old code and (e.g., by implication) what percentage of customer traffic should be directed towards a second set of computing resources that runs the new code being deployed. For example, a customer may utilize a customer computing device 118 such as a personal computer to request access to a website hosted by a computing resource service provider.

The request may be processed, at least in part, by a software that includes executable code to run a page host 116 that determines the website includes various cards (e.g., widgets or plugins) and submits a request to access the cards, which are received by the load balancing/routing component 114 which, based on the overall flow of network traffic, may route the request to utilize an older version of the application code associated with the card or a newer version of the application code that is being deployed across the server fleet.

Figure 2:
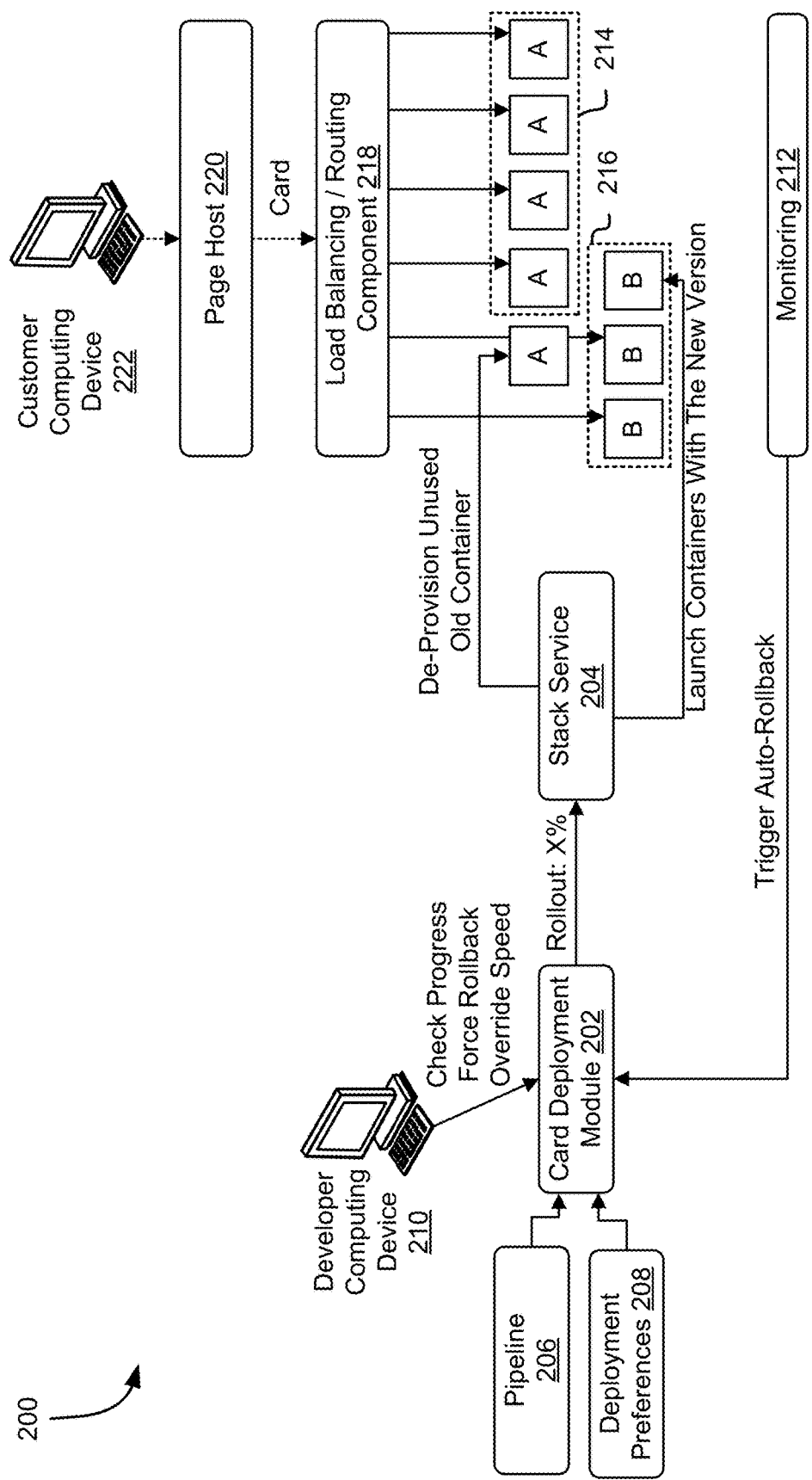
FIG. 2 illustrates a computing environment in which card deploy utilizes a stack service to roll out source changes via a pipeline infrastructure to customers with an auto-rollback mechanism, according to at least one embodiment.

FIG. 2 illustrates a computing environment 200 in which various embodiments may be practiced. The card deployment module 202 may be implemented to deliver one or more of the following functions: command the execution and the routing layer (similar to: disable host from load balancer, swap the software, enable host in load balancer) and can be used to replace a software version with another one (e.g., gradually over time). In an embodiment, the stack service 204 can both determine the routing of the requests and capacity scaling, while in the future it could be any suitable container service for execution and another service for the routing layer. In an embodiment, the card deployment module 202 may be utilized to execute the deployment according to deployment preferences 208 that set the pace, the rollback criteria etc. In an embodiment, the card deployment module 202 may be utilized to enable manual emergency actions such as deployment stop, rollback to the last version (or last few versions), speed-up/slow-down the deployment/rollback. In an embodiment, a software developer, via a computing device (e.g., the developer computing device 210 illustrated in FIG. 2) can invoke actions via a graphical user interface and/or a command-line interface. In an embodiment, the card deployment module 202 may be utilized to provide a GUI which will be referenced from the pipeline 206 which will offer visibility into the deployment status, links to the emergency actions as well as the configuration interface. In an embodiment, the card deployment module 202 may be utilized to enable missing pipeline features until they will be added: Prevent triggering automated deployments while alarms are triggered. Prevent automated deployments during blackout periods, weekends etc. In an embodiment, the card deployment module 202 may be utilized to enable leverages for the service to react to security concerns.

Integration with the executing and routing layer may be implemented, in an embodiment, using a stack service API. Registering a card for the first time is, in an embodiment, done by using an on-boarding portal. The name will be reserved both in stack service, in a content resource library (CRL), package names may be reserved in GitFarm etc. A card builder may return a new card version. The card deployment module 202 may be responsible for registering this new version into the executing and routing layer as triggered by the internal pipeline (or manually in case of an emergency). The stack service may be utilized to abstract both the execution layer and the routing, for example, through an interface. In an embodiment, integration with a serverless compute service provider as an alternative software execution layer may be utilized, but the stack service could take this responsibility instead.

In an embodiment, card deployment module 202 receives information forwarded by the pipeline 206 from a card builder and the card deployment module 202 is able to utilize the card version and access to the image. In an embodiment, there are some functionality that can be moved between the card builder and the card deployment module 202, for example replicating an image to a specific region.

In an embodiment, a developer of a card utilizes, via a developer computing device 210, a card manager portal which uses an authentication server and is capable of determining the user's teams (permissions). Setting the deployment preferences 208, viewing all deployments that are in progress and manually performing override actions will be part of the user interface. Given the integration between the card builder and card deployment module 202, we can show the full diff between two card versions, something that is impossible to see straight from the pipeline. The link between the card deployment module 202 UI and the pipeline 206, in an embodiment, is via custom links that are set to custom execution steps.

In an embodiment, the actual deployment is implemented as a workflow which can be modeled using a serverless compute step functions, similar to the card builder model. In order to expose the deployment into the pipeline the custom execution step may be utilized. To reveal the deployment progress, the on-boarding portal (a serverless compute service provider application) can be used, which authenticates users using an interceptor.

In an embodiment, executing and routing layer is not required to maintain the hosting solution and neither the routing one, while DevEx does not need to own deployments because Code Deploy would work on top of the container and routing solutions. In some cases, DevEx and/or Solitaire (executing and routing layer) might be required to implement very lightweight adapters to leverage the service provider offering for cards in a way that makes sense. In this ideal world we might decide either to let each card owner own the service provider hosting or to provide a shared fleet and determine a way to charge back.

In an embodiment, the card deployment module 202 provides an interface that exposes the hosting and routing layers and is able to be utilized to orchestrate a deployment. Accordingly, developers and other entities can then build a small adapter (e.g. using serverless compute service provider) to tie those actions to operations that make sense for their hosting or routing solution, and the same approach could work for them to provide the deployment functionality on top of the container service and their routing solutions.

A technique known as blue/green deployment may refer to a framework for releasing applications by shifting traffic between two identical environments running different versions of the application. Blue/green deployments can mitigate common risks associated with deploying software, such as downtime and rollback capability. Blue/green deployments provide near zero-downtime release and rollback capabilities. The fundamental idea behind blue/green deployment is to shift traffic between two identical environments that are running different versions of your application. The blue environment 214 represents the current application version serving production traffic. In parallel, the green environment 216 is staged running a different version of your application. After the green environment is ready and tested, production traffic is redirected from blue to green, and the unused old containers of the blue environment 214 may be de-provisioned. If any problems are identified (e.g., by a monitoring 212 software or service), the application version can be rolled back by reverting traffic back to the blue environment. A routing layer 218 may be utilized to shift traffic between the blue environment 214 and the green environment 216. A customer, via a customer computing device 222, that submits a customer request (e.g., to view a website) may be directed to one version or another of the application or card, which may be selected from the blue environment 214 or the green environment 216 in proportion to how much of the traffic has been shifted from the blue environment 214 to the green environment 216. The customer computing device 222 may utilize the page host 220 and the load balancing/routing component 218 in the same or substantially similar manner as discussed in FIG. 1.

Figure 3:
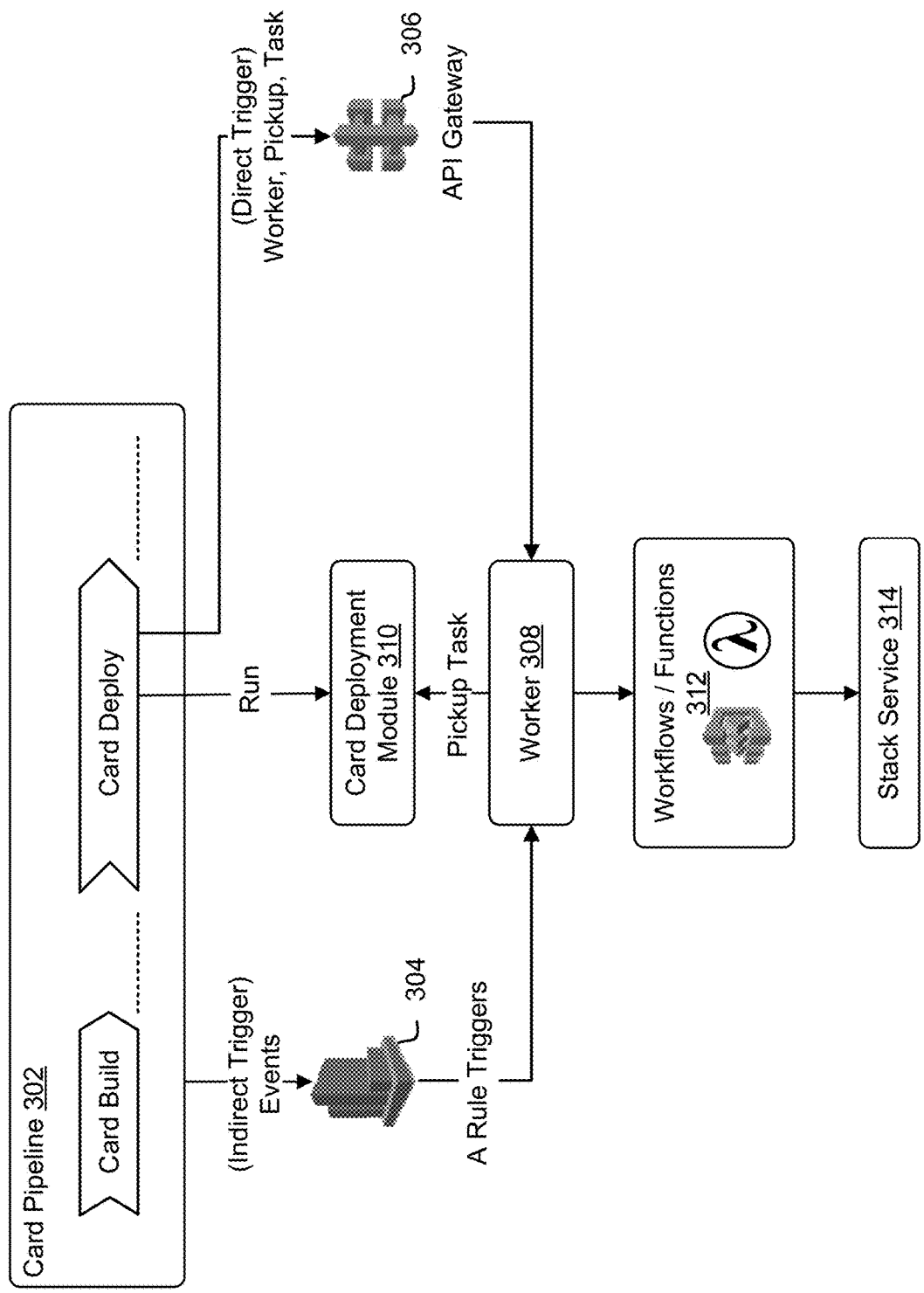
FIG. 3 illustrates an embodiment in which card deploy is run as a custom step of a pipeline trigger, according to at least one embodiment.

FIG. 3 illustrates a computing environment 300 in which various embodiments may be practiced. The card deployment can run as a custom step of a pipeline trigger as it is not a short lived action and may not be supported or may be unsuitable or ill-suited for implementation by a serverless compute service provider. In some cases, such as in computing environments where it is inefficient to continuously poll for tasks, a worker can be triggered directly by a serverless compute service provider (which complicates the pipeline by adding an additional step), or by a rule that matches the resource-monitoring event emitted by the pipeline which has been configured to do it in the automated on-boarding. The subscription to these events may also be done during the on-boarding.

The worker 308 can be implemented as a thread, process, function, routine, application, plug-in, script, or any other software-based paradigm for executing code. In an embodiment, the worker 308 is triggered to pickup a task by an indirect trigger 304 such as a trigger generated by an notification service in response to the satisfaction of one or more conditions (e.g., the occurrence of an event) or a direct trigger 306 such as an API command submitted via a graphical user interface or a command-line interface. The deployment of the card using the card deployment module 310 may be executed as a custom step of the card pipeline 302. In an embodiment, the workflows/functions 312 refer to serverless compute workflows that are executed in the context of a serverless compute service provider and invokes the stack service 310 in the creation, configuration, and management of stack resources. The first step of deployment, creating a stack for the card, starts when the card is created. The stack service 314 may be called for the initial setup and/or onboarding process. When completing all details necessary for creating a card, behind the scenes the card is registered to a cluster (described in greater detail below), using an API command to access the stack service. After creating the stack, actuals deployments can take place.

A stack service 314 may be utilized in the creation, configuration, and management of stacks, which may refer to a collection of computing resources hosted by a computing resource service provider that can be manage as a logical unit. Once a stack is created, a card can be deployed to the stack service 314. Deployments can be triggered by pipelines, or manually from CardCentral. Both manually and programmatically triggered deploys can use the same card deployment workflow component to deploy cards to Solitaire cluster. During deploys, if something goes wrong, a rollback can be automatically triggered from pipeline, or manually from CardCentral. Detecting a negative deployment (e.g., detecting a system running an older version) may also be used as a rollback to cancel an ongoing downstream stage of the deployment.

Unlike the current deployments that deployment services practices in which hosts are taken out-of-service in order to change the software, Blue-Green deployments spin-up additional capacity for the release candidate, start shifting traffic towards it and afterwards it terminates the old capacity. There is a time frame in which both capacity is up and rolling-back simply requires routing the traffic back to the initial capacity. The deployment service is frugal from the deployments perspective, in general it can make use of the excess capacity that we keep provisioned.

In an embodiment, the deployment service keeps the old software on the host. Turning the old software back can be as simple as switching the symlink back to the old deployment and re-running the flip-activation steps which is faster than a full deployment that most engineers used to practice.

Card deployments utilizing blue/green deployments can be optimized: the executing and routing layer can shift traffic off a container but still keep it alive for a while. The executing and routing layer can suspend a container execution to free-up computing capacity while ensuring very fast resume time with just a memory cost. The executing and routing layer can react faster than Apollo because launching containers is faster, the only part that is the same is the warmup period which is 100% dependent on the software. The container launch speed also depends on the size, but since containers are layered there are various scenarios in which only the top layer of an image needs to be downloaded.

Figure 4:
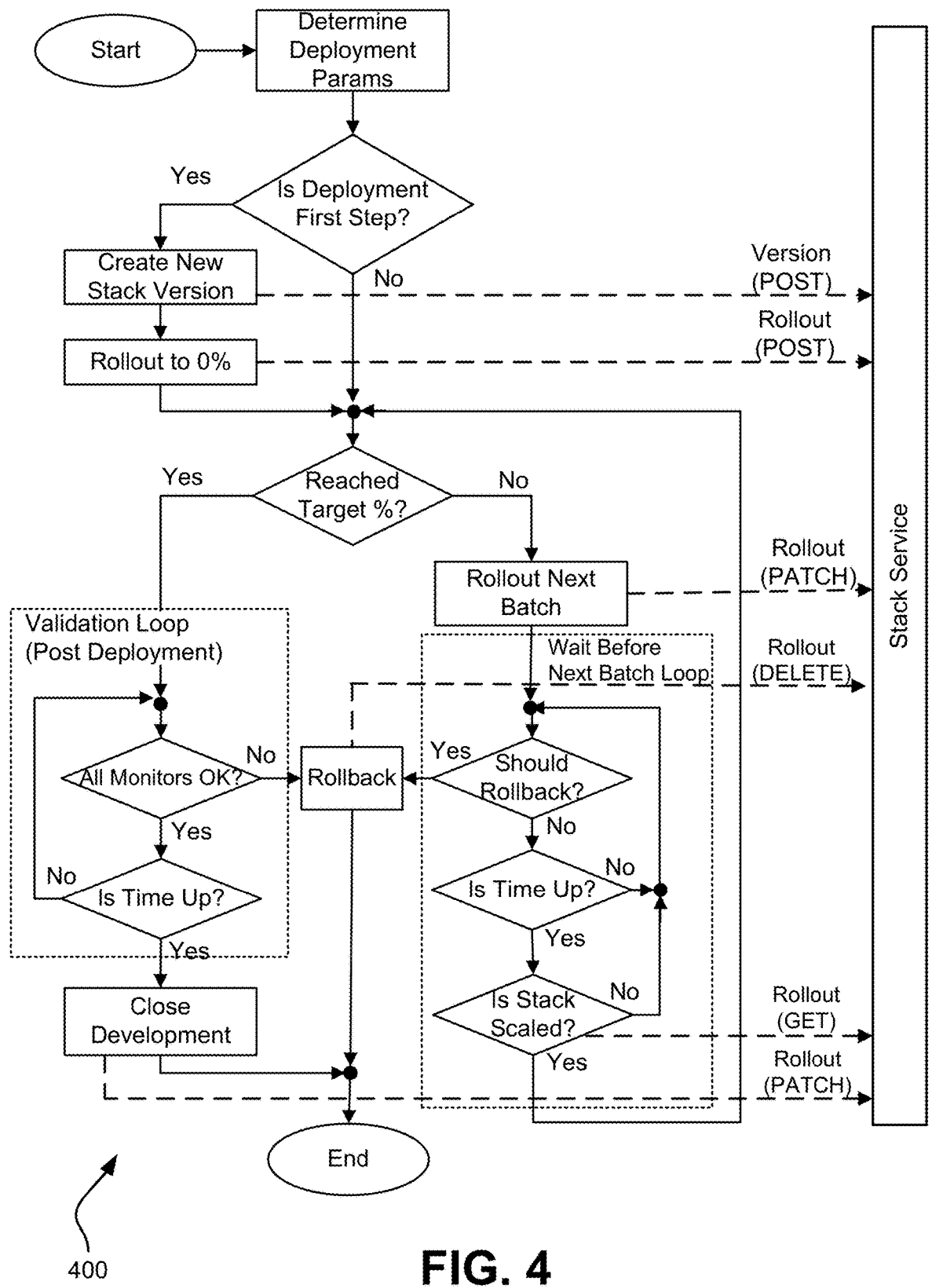
FIG. 4 illustrates a process for card deploy with rollback, according to at least one embodiment.

FIG. 4 shows an illustrative example of a process 400 for card deploy with rollback, according to at least one embodiment. Some or all of the process 400 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The computer-readable storage medium may be a non-transitory computer-readable medium. In some embodiments, at least some of the computer-readable instructions usable to perform the process 400 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

In an embodiment, the process 400 starts determining deployment parameters or deployment preferences that include configuration data that can be utilized to execute a deployment. The deployment parameters may specify set the pace, the rollback criteria, etc. of the deployment. For example, the deployment parameters may be viewed as a predefined recipe to gradually release new code (e.g., a security patch) and to be able to react by programmatically rolling back if any of the monitors signal an issue. Process 400 may be performed in response to detecting a source code change to a card. In an embodiment, the system determines whether the deployment is at a first step, and if it is, creates a new stack version that, in an embodiment, includes the provisioning of computing resources (e.g., a one-box setup). The first step of the deployment may include causing 0% of network traffic (e.g., customer requests for cards) to be routed to the newly created stack resources. The system may determine whether a target percentage—referring to the percentage of production traffic that is routed to the new stack resources. Examples of targets may include a target of 0% for no-traffic stage, 1% for a one-box stage, and 100% for a full prod stage. The one-box stage may be configured at some small percentage such that adverse changes impact quality metrics enough to be detected by monitoring systems, but not so great that they cause large-scale impact to the customer experience.

If the target percentage is not reached, the system may gradually roll out the deployment. The system may rollout a change to a next batch of stack resources. In an embodiment, these resources are stack resources that have already been provisioned, but are not yet configured to receive production traffic (e.g., customer requests), so that rolling out the change may include configuring a routing or load balancing component to route traffic from one environment of a blue-green environment to the other. In an embodiment, the system determines whether the system should perform a rollback. The system may check auto-rollback monitors, check whether we've been waiting for too long for the stack service to deploy. If something stops at their side, we trigger the rollback to exit the inconsistent state. The determination may be based on running unit tests, monitoring quality metrics, and more. In an embodiment, the quality metrics are collected for the production environment as a whole, and the rollout rate may be selected such that adverse changes should not result in greater than a severity-3 alert. In an embodiment, a monitoring system detects the failure of test cases, smoke tests, quality metrics, or other indicators that a change may adversely impact end-users and cause a roll back of the change. In an embodiment, the system determines whether time is up—for example, the deployment parameters may indicate that, as part of the gradual roll out of a change, that there is sufficient bake time at each stage to allow for errors to be detected. In an embodiment, the system will scale up the stack resources to accommodate for a next stage of resources needed. If the target percentage is reached (e.g., a change has been rolled out to 100% of production environment), a post-deployment validation may be performed, which is especially useful to trigger auto-rollback on one-box stage which is a short deployment that would normally end before any alarm could be triggered. A validation period can be set to 0 minutes, in some cases. All monitors may be checked to ensure that quality metrics are satisfactory, and there may also be a minimum bake time before closing the development. A stack service may be utilized in various steps of the deployment process.

Figure 5:
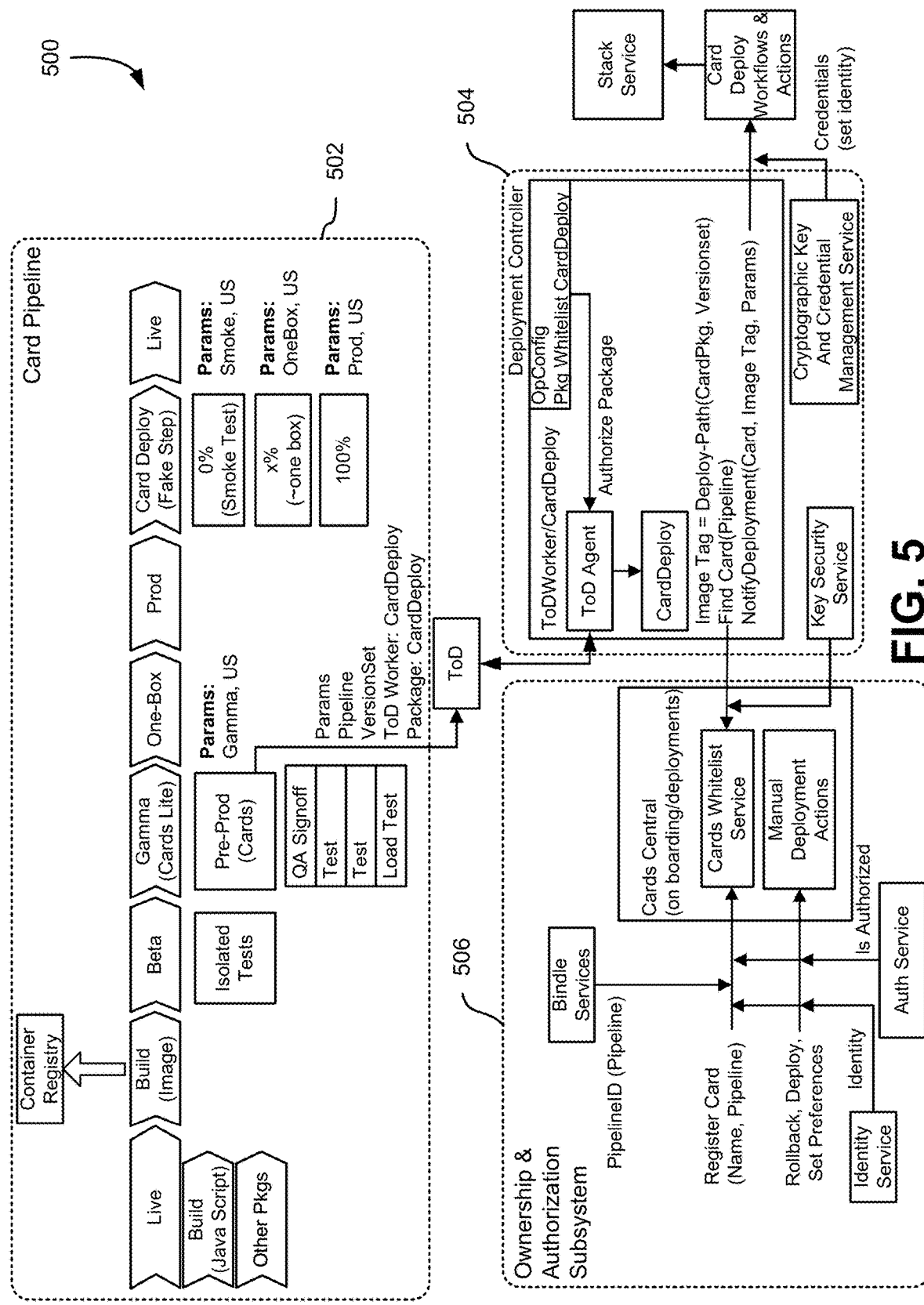
FIG. 5 illustrates an end-to-end overview from build to deploy, according to at least one embodiment.

FIG. 5 illustrates a computing environment 500 of an end-to-end overview from build to deploy, according to at least one embodiment. The figure illustrates various aspects of the computing environment, including a card pipeline 502, a deployment controller 504, and an ownership and authorization subsystem 506.

Two concepts are responsible for changing a card: software operations of replacing a product with a newer version of it according to a release recipe—known as deployment—and shifting more or less traffic to a specific piece of experience as a business decision which is modeled via campaigns. A deployment may be responsible for delivering incremental updates to an existing card to improve aspects such as latency, hardware cost or fix small bugs. A deployment may be used to re-deploying the same code to a set of computing resources with the purpose of restoring a system out of a drifting state (e.g., an application or operating system running on the computing resources becomes wedged or reaches an otherwise unrecoverable state). Deployments can be tied to software and hardware monitoring and, in some cases, typically take between minutes to a few hours. However, it should be noted that deployments can be complex and span computing resources across multiple regions, include a plethora of redundant copies, and may, generally speaking, take have an expected deployment duration on the order of days or weeks in some cases. The duration may be selected based at least in part on the use case. For example, a deployment focused on code quality may be performed in a matter of minutes or hours, whereas a deployment focused on business needs (e.g., how favorably consumers respond to the change) may take weeks or even longer.

In some environment, such as a retail website, due to the contention and tight software coupling, many code changes are hidden behind a selective code delivery service (e.g., A/B testing service) and despite the fact that there are associated costs they never out-weight the costs of an emergency code rollback. Cards on the other hand are independent units of deployments which means that deployments that target fixes or tweaks which have no questionable business impact become a viable alternative.

Various entities (also referred to as actors) may perform actions related to a release. These entities may refer to software entities (e.g., software applications) that are executed on and/or controlled by different computer systems across a network. Release actors may include: a service or computing entity that provides the execution and the routing layer; a service provides that the control API to register a new card, lease resources, roll-out percentage, etc.; a service or computing entity that provides the campaign management tools and the Web site agents that deliver the best fit experience information or even manage the connectivity to the widget/cards; a selective code delivery service implemented as a service or computing entity that is an experimentation controller that will turn on/off code paths based on various metrics wherein the delivery service may be used to perform A/B testing between old code and new code being deployed; a service or computing entity that provides pipeline recipes for cards as well as the deployment controller which is invoked by the pipeline. The deployment controller orchestrates the code deploy by calling an API. Deployments will use pre-defined recipes that dictate their velocity and the auto-rollback triggers.

In an embodiment, the operation of a pipeline 502 (e.g., applying a security patch) is described according to the following process: a source, such as source code, assets (e.g., data file, image file, media file, etc. utilized in connection with cards) is modified. In response to a source change, a card build may occur. For example, the card build may include compiling source code that was modified, and may occur programmatically and/or manually. A trigger may be utilized to detect a change in the source, which may include detecting that source code of a source control or repository system has changed.

As part of a pre-prod step (sometimes referred to as a Gamma stage) Solitaire, which may implement the execution and/or routing layer, may facilitate testing by providing compute resources (e.g., a fleet of servers) for testing purposes. For instance the connection to a private API can be implemented based at least in part on a private link with Solitaire. The wiring of a card to a specific page host could use the same mechanism as in prod or could be as simple as hardcoding the card endpoint. In an embodiment, the outcome is that teams that used to test in "Gamma" will find no difference in capabilities when testing the cards and they can also test old widget vs. cards using the same testing environment. After deployment to the pre-prod environment and execution of the tests, the process may proceed to deployment to a first locale.

In an embodiment the deployment is staged in tiers—for example, a staggered deployment to a first locale (or a first subset of locales), and then to a second locale (or a second subset of locales) may be utilized so as to control the blast radius of a change so that an adverse change that is detected at the first locale (or first subset of locales) can be quickly detected and rolled back with minimal impact to production environments. In an embodiment, a tree structure is utilized so that successful deployment to a first locale (e.g., locale 'A') is used as a trigger to deploy to other locales (e.g., locales 'B' and 'C') and so on (e.g., successful deployment to locale 'B' triggers the deployment to locales 'D' and 'E').

Solitaire regions may each have their own respective endpoints with regard to the deployment to prod regions. One of the stack service deployment API fields is the container image. In each region either card deployment module or card builder will save an image copy which is also important for the launch speed as Solitaire will fetch the image from the same region.

With regard to prod deployment steps, the first deployment step may be to start one or more containers without shifting real traffic (e.g., human traffic, search engines) to it. This may be referred to as a no traffic one-prod. The container may be accessed through a different endpoint. Next, a one-prod may refer to the state equivalent to a one-box (e.g., one server) environment. The one-box concept may be incorrect when it is too small or too large for the particular deployment. For example, if one host out of three is changed the failure rate may be unacceptably high, whereas if only a small portion of traffic is shifted to the new code, the data may be inconclusive as to the impact of the change and whether to move forward with the deployment. Containers, serverless compute, and/or routing can provide a better granularity in some embodiments. Containers and/or serverless compute can be much smaller than a host and/or can be utilized to shift a predefined traffic percentage to one or more containers or executors. Accordingly, various techniques described above may be utilized so as to shift enough traffic to the new code so that the failure is detectable and attributable to the new code, but not so high as to cause a large-scale impact to the prod environment as a whole.

Once the one-prod environment is tested and validated, the new code may be rolled out to the full-fleet stage. The full-fleet stage may involve deployment of the new code across multiple servers or boxes, which may be staggered or tiered so as to control the blast radius of the change.

Some or all of the pipeline 502 deployment process described above (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, software, or combinations thereof. The code may be stored on a computer-readable storage medium, for example, in the form of a computer program comprising a plurality of instructions executable by one or more processors. The computer-readable storage medium may be a non-transitory computer-readable medium. In some embodiments, at least some of the instructions usable to perform the pipeline process are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

Variations on the deployment system may include pre/post activate/deactivate scripts. For example, as part of a post-activate step, a deployment system could warm-up a lazy-loading system or lightly test it so that some objects are delay-loaded to decrease initial load times. As a second example, a pre-deactivate step may include ensuring that all in-flight requests are fulfilled before proceeding to deactivation. For example, prior to removal from the load balancer and/or container decommissioning, a check is made to determine that all in-flight requests have been satisfied or are canceled.

In accordance with one or more embodiments, the deployment system can utilize various strategies for handling concurrent deployments. As a first example, the system can fail if there is already a deployment in progress, although the failure need not happen immediately, the triggers could wait and then retry, a rudimentary form of queuing. As a second example, the system could always queue the deployment, thereby serializing deployments. As another example, the last deployment could kill the in-flight deployment (e.g., rolling back the in-flight deployment). In some cases, an incoming and in-flight deployment can be merged if the system detects that the deployments are duplicates (e.g., same code changes, such as in the case when the system is 'bounced.') In some embodiments, the customer configuring the pipeline deployment can enable one or more of the above options via deployment parameters (e.g., a GUI console) and the detection of a rollback or of a duplicate may be done in the internal pipeline trigger. However, since the same logic may exist with other triggers, the logic may also be embedded as part of the deployment workflow so that all triggers provide the same experience.

An internal pipeline trigger may be described below, from on-boarding to build to deploy. The card deployment module can utilize Test on Demand (ToD) as a deployment trigger from the internal pipeline. The reason is that a ToD approval step has very few states in which it can be found and very few actions to change those states: not started, started, cancelled, retried. Deployment services on the other hand can be found in plenty of states and a lot of manual actions can be detected and interpreted by the trigger. In some cases, a custom build step would have not offered any special benefits compared with ToD.

Various authorization processes for deploying approved pipelines may be described below that utilize an ownership and authorization subsystem 506. A graphical user interface may be utilized in connection with registering a card. In some cases, mapping a pipeline to a card is authorized only if the owner performs this association. In an embodiment, the owners of the card and of the pipeline are authorized to establish the connection between them, but other entities could be trusted to perform those responsibilities (e.g., deleted by being authorized to assume a specific role). The pipeline may have an associated pipeline identifier that uniquely identifies the pipeline. In an embodiment, an authorization service is used to uniquely map a pipeline to a card after verifying the owners intended to perform the association. The pipeline ID may be obtained from the Bindles Service. Only authorized individuals will succeed in performing manual actions against the pipeline.

In an embodiment, an authorization service or service provider principles may be utilized. The trigger itself may need to be authenticated and authorized when interacting with other applications or parts of card deployment module:—key security service—for client/service to service calls, for example when calling Card identity APIs. Service Authorization—a cryptographic key belonging to a service user will be used by the card deployment trigger to post a service level Event, post a notification or put an item into a queue in the card deployment account that has some or all serverless compute workflows. The key security service may be used to implement schemes for authorization, authentication, and/or accounting and may utilize techniques in accordance with those described in U.S. Pat. No. 9,596,244, entitled "SECURING SERVICES AND INTRA-SERVICE COMMUNICATIONS" which is hereby incorporated by reference. In some implementations, the key security service is a security service that enables service providers to register services that are available to be used by service consumers. When a relationship is established between a service provider and a service consumer, the service consumer assumes the role of a client to the service provider. Prospective service consumers may apply to the security service to access a registered service. In some instances, the security service may collect information from prospective service consumers, such as service consumer contact information, application programming interface (API) usage descriptions, expected amount of usage of the service, desired access conditions, desired whitelisting rules, and the like. The collected information is provided to the registered service that the service consumer desires to access to allow the service to determine whether to authorize access by the prospective service consumer. Following approval of the service consumer's application by the provider of the registered service, the security service can implement access policies that include authorization information and whitelisting rules for controlling the conditions under which the service consumer is able to access or utilize the service.

Furthermore, some instances enable near real-time propagation of access policy changes from a user interface to running services, such as in less than one minute. For example, the registered services may perform a periodic synchronization of access policies with the security service to ensure that the latest versions of the access policies are being enforced. Additionally, some implementations include the ability to broadcast access policy change events to other parties within the enterprise. For example, certain entities in the enterprise may wish to monitor which service consumers have access to which services and to which portion of those services. Accordingly, these entities may subscribe to receive broadcasts of each approved change to access policies, such as changes to whitelisting rules and access authorizations. As another example, when a service provider for a particular service needs to change how the service is accessed or change certain features of the service, these changes may be broadcasted to the registered service consumers of the service and the registered service consumer may subsequently revise how they utilize the particular service.

In addition, some implementations include the ability to label data as secure, and to allow service consumers to opt-out of receiving of receiving the secure data. Further, some implementations enable masking or redacting of information provided to particular service consumers based on determined needs of the service consumer for access to particular information. Thus, if a service is able to provide service consumers with a certain quantity of information, different service consumers invoking the same API for that service will automatically receive different information depending on the particular access policies (i.e., whitelisting settings) established for each particular service consumer with respect to the particular service. For example, suppose that a service provides customer data that may include the customer nine-digit postal code to internal service consumers that request customer information. Based on need for information pre-determined for each service consumer, a first service consumer may only be provided with only the first five digits of the nine-digit postal code when customer data is requested, while a second service consumer may be provided with the entire nine-digit postal code when customer data is requested, and a third service consumer may receive no postal code information at all when customer data is requested. In some instances, all the service consumers may call the same API to request the information using the same parameter, but may be provided different levels or different subsets of the same information based on their demonstrated need for the information, as established by the access policies. Additionally, some implementations may include a periodic "baselining" in which access permissions previously granted to service consumers expire on a periodic basis, such as annually, and the service consumers must re-verify the need to access certain information.

Furthermore, in some implementations, a service can subscribe to the security service herein and copies of log data pertaining to the service are maintained by the security service. For example, the security service can receive log information from each registered service and maintain log files pertaining to service consumer usage of the service, performance of the service, and the like. The log files may be monitored for detecting anomalies, security breaches, excessive usage of a service, and the like. For example, the security service may issue an alert to a service provider to when usage anomalies are detected.

Additionally, some implementations provide a user interface that may include a single control that can be activated by a service provider to block requests received from a particular service consumer for accessing a particular service or multiple services. Thus, the blocking of one or more selected service consumers may occur at the service level, such as when an anomaly or excessive usage is detected. In some implementations, a service provider may block a particular service consumer from accessing a particular API when the service consumer access requests exceed a predetermined threshold over the service consumer's stated expected access requests. Further, because service consumers provide expected whitelisting information, such as expected number of transactions per second, when applying for access to the registered service, a well-behaved service consumer can determine the best way to stop generating problematic requests, and thereby address at the source any actions that are causing problems for a particular service. For example, a service consumer may implement throttling of access requests issued to a particular service to maintain the requests within the expected number of requests specified when the service consumer applied for access to the service.

ToD workers can be limited to execute only certain applications, which may be selected based on various criteria and included in a whitelist document or package. In an embodiment, only authorized pipelines can deploy—Our ToD worker only allows our scripts to run. Our scripts determine if there's a card associated with the pipeline. Only one pipeline can deploy a card. A pipeline could deploy multiple cards. The pipeline name is retrieved by the ToD agent so it cannot be impersonated by other pipeline owners. The ToD agent may be implemented as part of a system wherein a pipeline security dispatches well-defined task to a plurality of hosts that act as workers (e.g., workers in a worker pool). Each worker, in an embodiment, is configured to have a ToD agent running that pulls the tasks. Such a system may be utilized to ensure that an unauthorized entity cannot trick a ToD worker to execute a task that has not been dispatched by the designated sources. For example, an unauthorized task could attempt to make the worker reveal credentials that could be used to give an otherwise unprivileged user access to computing resources.

In an embodiment, a card is a resource which needs to be uniquely identified. A card ID is a Bindle Resource ID which may be encoded as, for example: svcprvdr1.bindle.resource.foobarbazrandomstuffabcde. In an embodiment, the Bindle resource is "Card" and is managed by the Cards service teams. In an embodiment, a metadata service is used to store information such as: information that encodes the creator of the card any other additional information. In an embodiment, a content resource library (CRL) accommodates this information especially because it is going to be the source of information for the content scheduling system.

In an embodiment, a Bindle is a team-owned collection of related resources for which permissions should be managed as a single entity. In an embodiment, a card is implemented using some or all aspects of a Bindle. In an embodiment, a card is a mixture of resources which temporarily include even the internal pipelines. In an embodiment, Bindles have a baseline process which are utilized by cards for strong ownership and/or accountability. In an embodiment, use of Bindles also has a highly available and scalable authorization service that provides authorization APIs for resources that are managed in Bindles.

Bindles operate with the following concepts: owner, resource, actors and permissions. We own the type of resource called Cards and we can define various types of permissions such as: "Deploy", "View", "Manage". One can go into a Bindle and add a person or a team as an actor then grant the permission to "Deploy" cards. A Card can only be part of a single Bindle, but it can be transferred if both the source and the target agree.

In an embodiment, Bindles jurisdiction doesn't span into the service provider space. A Bindle can define who owns and who's authorized to use a service provider account, but it cannot tell a service of the service provider (e.g., a security token service) whether a role can be invoked by some service provider account, at least because this area of ownership is associated with another service, such as an identity access management service.

In an embodiment, there exist differences between Bindles and identity access management with regard to permissions management. In an embodiment, Bindles can manage permissions for a random numbers of actors such as the whole CDO, a team, a random number of individuals, a service provider account etc. In an embodiment, the identity access management service does not support the "Organization" type of principal (called "actor" in Bindles). It only supports a limited list of accounts/sub-accounts OR services. Although identity management service would still be needed as an extension into the service provider space, there would be a limited need to interact with it in various embodiments. For example the ownership change of a service provider account (managed by Bindles) would automatically reflect into identity management service/security token service, only the new owners would be able to assume a specific role. The users/roles/policies are likely to be created during the on-boarding, and left unchanged ever after.

In an embodiment, the cards service has shared ownership on the Card Bindle Resource Type. DevEx has created it, but any service team that would need to define a new type of authorization criteria would be entitled to have it added into the resource type called "Card".

With regard to who owns the Bindle resource instance, in an embodiment, the card owner owns its Bindle. Technically we (a service team) could own it and manage it for the user, but that would be wrong. It is possible for us to propose Bindle changes that need to be approved by the cards owners, we don't need to own the resource. We're also the owners of the "Card" resource type which offers us the leverage to extend what a card means. More importantly, having a system that is a broker for another identity and authorization system is a bad idea, a good study case would be Conduit over identity management service. Now if a user wants to transfer a pipeline from a Bindle to another it doesn't need to go to Pipelines, it goes to the service that manages the ownership, and for cards there would be no difference.

With regard to authoritative data stores, Bindles, CRL, and Card Stores may be utilized. Bindles may be the authoritative source for the Identity and permissions, systems will likely call an authorization service to get the answer to "isAuthorized" or "canDeploy". CRL is the metadata authority. The information that needs to be shared between multiple systems can make use of CRL. However, things like Deployment Preferences will not be stored in CRL. The card deployment module owns and operates on this data, and hosting the internal state on a different system would only attract risks. If tomorrow CodeDeploy would entirely replace Card Deploy the deployment preferences would belong to CodeDeploy. Cards Store may be, in an embodiment, a container service hosted by DevEx which stores what CardBuild produces. When containers will be signed, their signatures could be pushed to multiple systems, including the CRL.

In an embodiment, creating a new card starts on the Cards Central portal that guides the user to picking a unique name, and then automates all the white-lists and sends data to various services, such as a whitelist broker, a CRL for all the metadata, and a stack service where a new stack is created.

When a new card is created or when existing resources are enrolled as a card the on-boarding will help with the ownership and authorization on the service provider space by creating identity access management resources. For example a team creates a new card. They will point us to a service provider account that the team owns (we check this using the authorization service). We will grant access to that account to assume a role which is allowed to read the Card Base Image from a container service that we own. Any team member can now obtain the Card base image because an authorization service authorizes any team member to use the service provider account which is whitelisted on our side to assume the role with read permissions.

In an embodiment, if a computer system determines a role should be assumed, the system assumes a role by submitting a request to an authorization and/or authentication service and receives, in response, a token associated with the role provided by the authorization and/or authentication service that is usable to assume the role. A role, in an embodiment, has a set of permissions that grant and/or deny access to computing resources of a computing resource service provider—the permissions associated with the role may differ from the permissions associated with the system that assumes the role. In an embodiment, a trust relationship must exist between a user and a role for the user to be able to successfully assume the role (e.g., a database table stores mappings between principals and roles that the principal is allowed to assume). In an embodiment, the system uses a security token to assume the specified role by issuing a request comprising the token and an authorization service receives the requests, verifies that the permissions associated with the role are sufficient to allow fulfillment of the request, and indicates that the request should be fulfilled (e.g., by routing the request to the appropriate service for fulfillment). It should be noted that in an embodiment, assuming a role refers to the process of obtaining a security token associated with the role, performing actions under the role (e.g., issuing a request comprising the security token to a service), or both.

Figure 6:
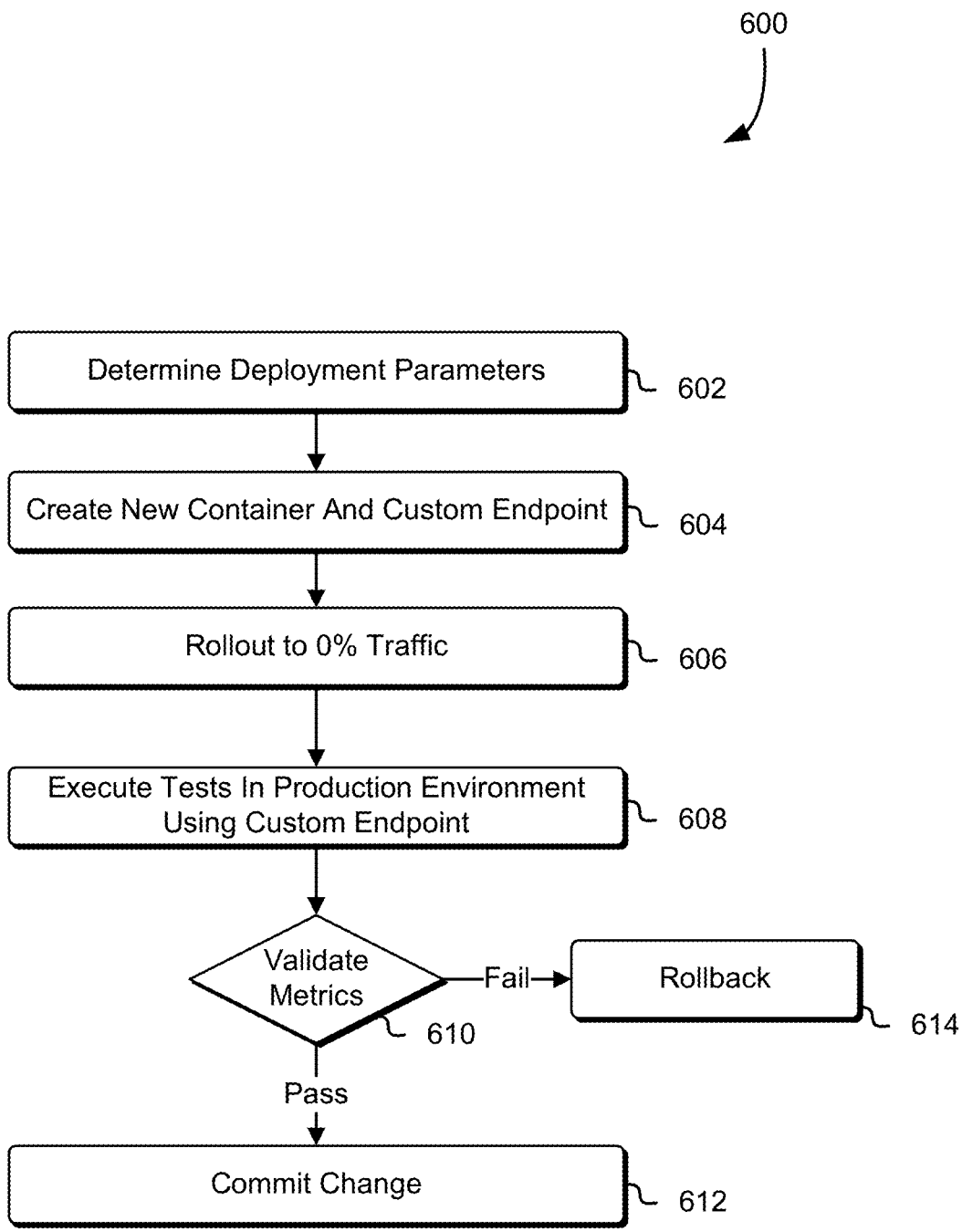
FIG. 6 illustrates a process for a possible card deployment pipeline, in accordance with at least one embodiment.

FIG. 6 shows an illustrative example of a process 600 for utilizing a card deploy pipeline to deliver a code change, according to at least one embodiment. Some or all of the process 600 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors. The process 600 may be performed by various computer systems described in this disclosure, such as a card deployment module in accordance with those described in connection with FIGS. 1-3.

In an embodiment, the system determines 602 a set of deployment parameters. The deployment parameters may include configuration data that can be utilized to execute a deployment. The deployment parameters may specify set the pace, the rollback criteria, etc. of the deployment. For example, the deployment parameters may be viewed as a predefined recipe to gradually release new code (e.g., a security patch) and to be able to react by programmatically rolling back if any of the monitors signal an issue. The deployment parameters may include a reference to source code or executable code that has been updated. The deployment may be triggered by a service provider pipeline trigger, an internal pipeline trigger, a manual trigger such as from a GUI or CLI, and more. The system may create 604 a new container that includes a custom end point. In an embodiment, the system utilizes a stack service to provision computing resources. A deployment solution may be a container and/or serverless compute deployment solution that enables the deployment of a card pipeline on stack service. Cards may be provisioned, configured, or otherwise conceived of as containers. A custom endpoint may refer to a private API or software hook that is exposed to the system but is not accessible to external entities such as customer computing devices. As part of the initial rollout, the system may indicate, to an execution and routing layer, to rollout 606 zero traffic to the new container. Accordingly, the new container may be a computing resource that is within a production environment, but is inaccessible for fulfilling customer requests. Instead, the new container may be accessible via the custom endpoint described above for testing purposes. In an embodiment, the system executes 608 tests on the new container using APIs exposed through the custom endpoint. The system then validates 610 metrics, which may include the results of the tests that were executed, smoke testing, and verifying that the new container is in satisfactory condition after determining that there has been sufficient bake time in the no-traffic stage to allow for errors to be detected. If the metrics fail, the change may be rolled back 614. In an embodiment, a monitoring system executes an auto-rollback (e.g., based on detecting an adverse event). However, if the system passes the metrics, the change may be committed 612.

Figure 7:
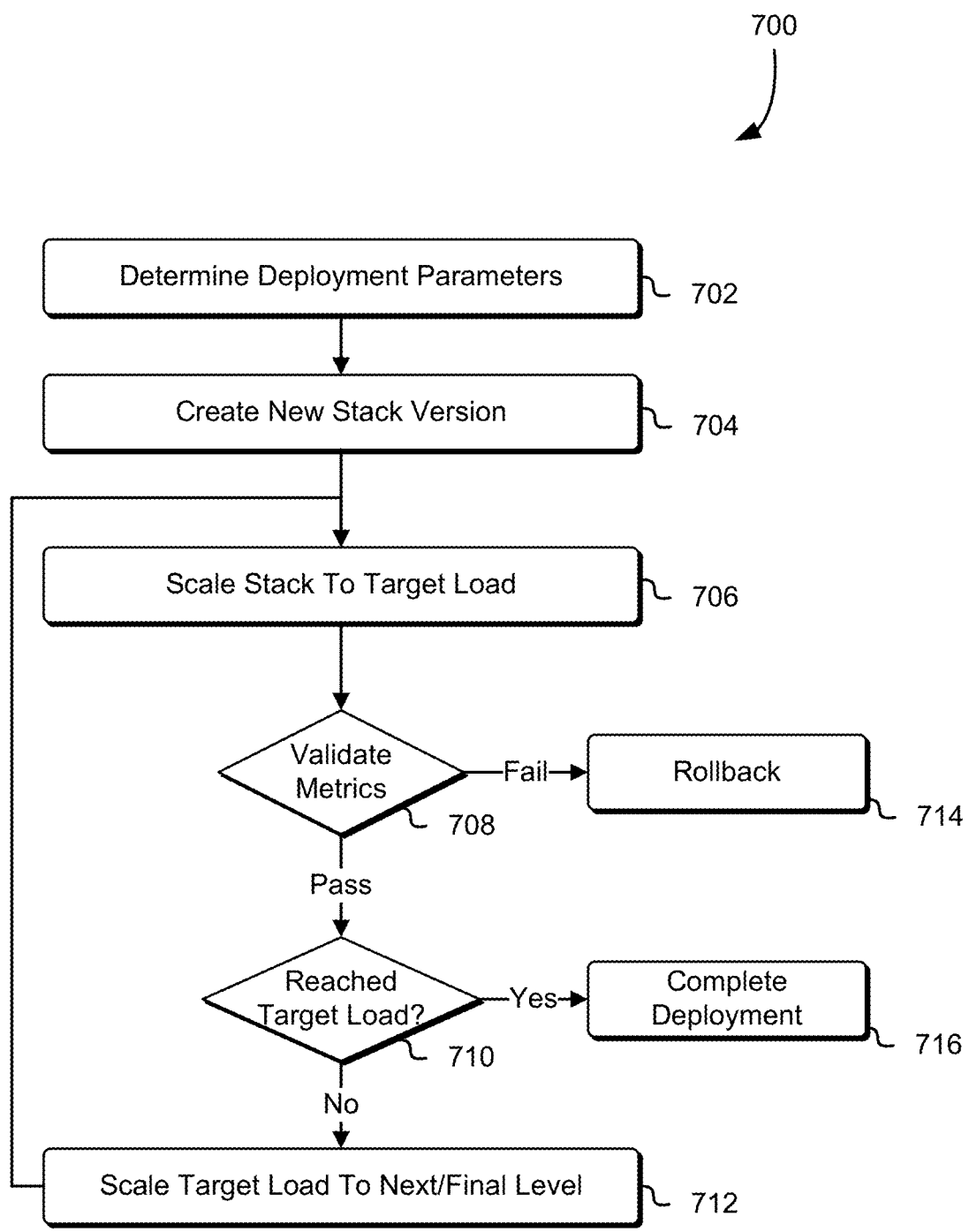
FIG. 7 illustrates a process for a batched card deployment, according to at least one embodiment.

FIG. 7 shows an illustrative example of a process 700 for a batched card deployment, according to at least one embodiment. Some or all of the process 700 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors.

The system performing the process 700 may be any suitable computer system, such as the card deployment module described in connection with FIGS. 1-3. The system may determine 702 deployment parameters, for example, in the manner described above in connection with FIG. 6. The system may submit an API request to a stack service to create 704 a new stack service and then scale 706 the stack service up to a target load. In an embodiment, the initial target load may be 0% for a no-traffic prod environment. The stack resources may, instead of being directed to process customer requests, first be provisioned to run unit tests, validation tests, etc. so that one or more quality metrics may be compiled. Depending on whether 708 the metrics are validated to have passed or failed, the system may rollback 714 the system (e.g., automatically, in response to metrics indicating high severity failures or an aggregate failure exceeding a threshold pass rate). If the system determines that the system has not yet reached a target load 710 for a particular stage, the system may increase the target load to the next level for example, from 0% for a first no-traffic prod stage to 1% for a one-box setup. The system may scale 712 stack resources to accommodate the additional load using an execution layer, which may be coupled with or decoupled from a routing layer, according to various embodiments. This process may be repeated until the system reaches the target load, and completes the deployment 716, such as by committing the changes to a versioning system, de-provisioning all stack resources running on a previous application version, and more.

Service and library teams may not be empowered to control their product life-cycle. In traditional computer systems, these teams are deprived of the gradual release and the rollback control, monitoring and deprecation. For example library teams are used to vend their products in a live version set. In some cases, there is no control on the rate of adoption, no monitoring abilities; the release is all-or-nothing. In many cases, when traditional computer systems are utilized, a change is rolled out to the live version set and then an error or unexpected behavior is detected, but at that point, it is already too late to rollback, as other version sets may have already consumed the bad dependency and service teams in using traditional systems may be notify the affected clients to take action. Service teams can be found on a similar situation. They often provide hosting for their clients and need to chase them to upgrade their dependencies both due to security implications, but also in order to be able to evolve. Launching a new set of features or deprecating the old ones is not in their direct control in various systems. Embodiments described in connection with this disclosure address some or all of the challenges described above. Accordingly, systems and methods described herein may improve the functionality of computer systems by mitigating (e.g., preventing) the release of harmful software to a customers of a computing resource service provider, thereby causing an improvement in one or more of the following aspects: security (e.g., preventing software that includes security vulnerability from being released); performance (e.g., preventing code with memory leaks or performance issues from being released); quality (e.g., preventing code with bugs that cause software features to break or behave in an unexpected manner from being released); and more.

Figure 8:
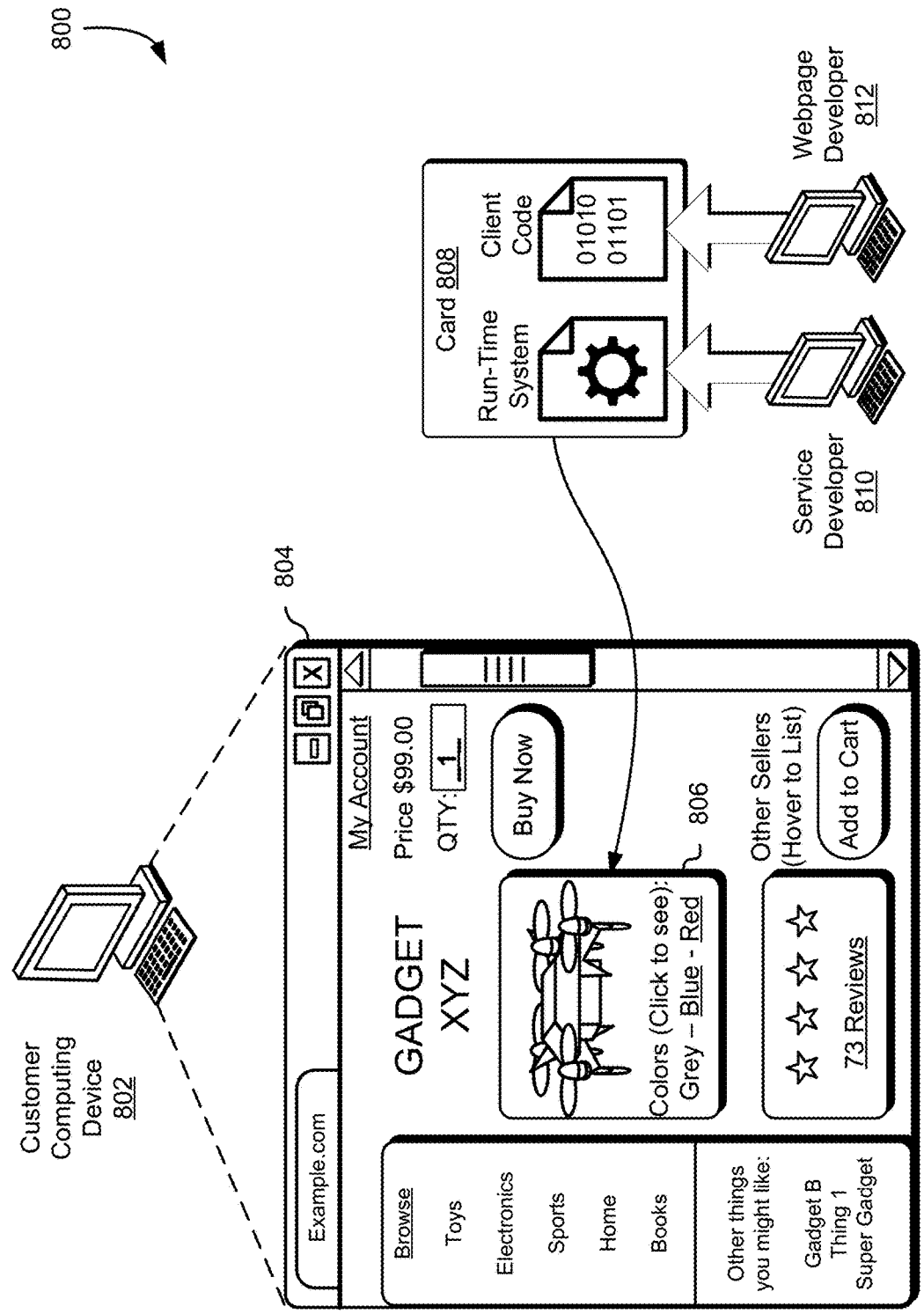
FIG. 8 illustrates a computing environment for implementing a user experience such as a webpage using one or more cards, in accordance with at least one embodiment.

FIG. 8 illustrates a computing environment 800 in which various embodiments may be practiced. The computing environment 800 may be suitable for implementing a user experience such as a webpage using cards, in accordance with at least one embodiment.

As illustrated in FIG. 8, a customer computing device 802 may be a computing device controlled by a customer that accesses a user experience, which may include, as an example, a webpage that includes various aspects. For example, in the webpage 804 shown in FIG. 8, a first component of the user experience 806 may include a picture of a product that is for sale by the owner of the webpage (e.g., the website is the website of an online retailer); a second component of the user experience may include a software widget that loads customer reviews of the product; a third component of the user experience may include suggestions of related products (e.g., browsing for product "GADGET XYZ" may lead to a suggestion to buy "Gadget B," "Thing 1," and "Super Gadget" as illustrated in FIG. 8); and more.

In an embodiment, a webpage 804 is constructed from one or more cards such as the card 808 illustrated in FIG. 8. A card, in an embodiment, is a piece of experience on the webpage such as a widget. Examples of user experiences that can be implemented using widgets include a dialogue box, product pictures, customer reviews, and more. The use of cards breaks the monolith of previous services in which code for a service is organized in a "flat" hierarchy and enables widget developers to author and release software for various features of a webpage independently.

A card 808 may comprise a run-time and client code. It should be noted that the client and the customer described in connection with FIG. 8 may not be the same entity (e.g., the client may be the developer of a retail website whereas the customer is a consumer that purchases products from the retail website). The run-time system may refer to service and/or library code that is utilized in the execution of the client code to generate the expected user experience. The client code may refer to source code, executable code, or a combination thereof. The client code may, for example, include a script written in a programming language such as JavaScript, TypeScript, Dart, and more. The run-time may refer to an execution engine usable by one or more processors to execute computer-readable instructions associated with the customer code. For example, if the client code is an executable application, the instructions may be the customer code itself. As a second example, if the client code is source code, a compiler or interpreter may be used to generate computer-readable instructions from the source code for execution by the one or more processors. For example, the card 808 illustrated in FIG. 8 may include client code that includes image assets for a grey version of "GADGET XYZ" as well as blue and red versions of "GADGET XYZ" and the run-time system may include an execution engine that causes the image displayed on the website to change to change when a customer clicks on "Blue" or "Red" as displayed on the website (e.g., causes the image on the website to change to the blue or red version of "GADGET XYZ" based on the customer's action).

In an embodiment, each card (or a portion thereof) of a plurality of cards is executed in its own container with an embedded execution run-time which can be optimized specifically for the card based on its usage. Multiple containers of the same card can be used for scaling availability of a card (e.g., across multiple webpages). In some embodiments, cards improve the efficiency of a computer system (e.g., service provider) by allowing each card to be scaled individually to meet the computational needs of customers—thus, rather than scaling the entire fleet, containers for an individual card can be scaled so that computational resources are scaled up or down based on the usage of the card itself.

In an embodiment, the run-time system and the client code are owned by different developers. For example, a developer team specializing in back-end and service-level features may generate and periodically update the run-time system. As a second example, a developer team specializing in front-end and user experiences may generate and update the client code. For illustrative purposes, a service developer 810 or team of service developers may own and author code related to the run-time system and a webpage developer 812 or software widget developer (or a team thereof) may own and author code related to the webpage. In various embodiments, service and/or library code may be utilized across multiple webpages (e.g., webpages for different types of gadgets) and those webpages may be owned by the respective webpage or widget developers. Systems and methods described herein improve the operation of computer systems by enabling service developers to deploy service-level changes in environments wherein other entities (e.g., the webpage or widget developers) own their own experiences in a controlled manner that prevents bad service code from negatively affecting the user experiences.

Figure 9:
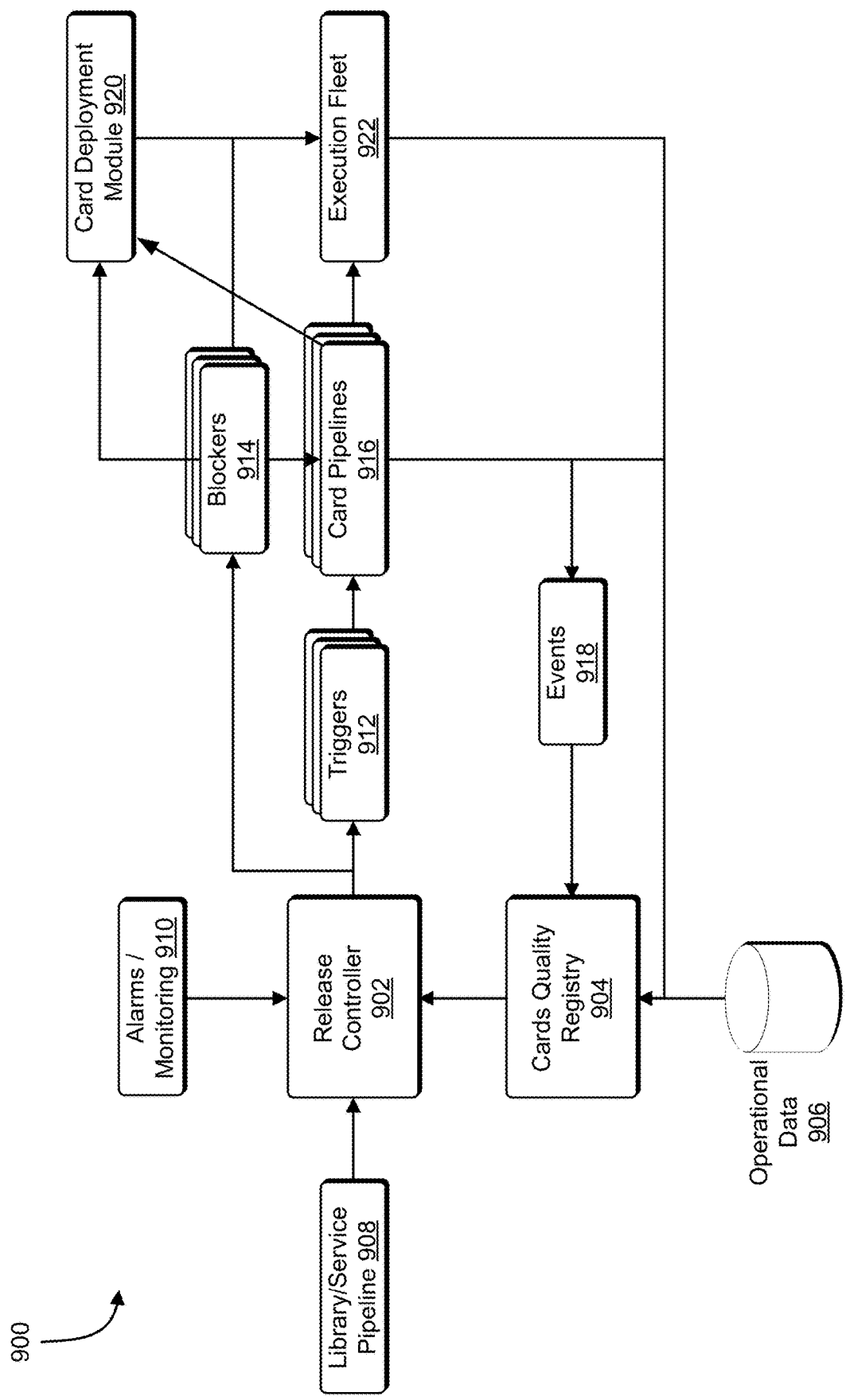
FIG. 9 illustrates a release mechanisms with controlled impact, in accordance with at least one embodiment.

FIG. 9 illustrates a computing environment 900 in which various embodiments may be practiced. The computing environment 900 may be suitable for release mechanisms with controlled impact, in accordance with at least one embodiment. As illustrated in FIG. 9, the computing environment 900 may include a release controller 902 that orchestrates one or more aspects of a deployment or release. The release controller 902 may refer to executable code (e.g., a software application) that, as a result of execution by one or more processors of a computer system, cause the computer system to orchestrate one or more aspects of the scheduling of a release. The release controller may gradually triggers card pipelines 916 on the latest version of the service libraries and/or components; track the evolution of the builds and/or tests in the pipeline to ensure they are not blocked; compares the evolution of the pipelines with their history; tracks the cards that reach the end customers and compares them with their past successes; triggers block and/or rollback actions in response to detecting an adverse condition; and any combination thereof.

The card quality registry 904 may refer to software (e.g., a software application or software component running on a fleet of servers of a computing resource service provider) that stores or is operable to store data associated with cards and their evolution. Data associated with cards may be organized and stored in the following manner: A tracking service may be used to track resource usage and, in an embodiment, is the registry for provenance tracking and the CRL stores metadata, and Bindles store ownership information. The tracking service may be utilized to track which cards utilize which versions of a service component (e.g., whether, a deployment updating service code has propagated to a particular card) and may be used as part of determining whether failed test and/or alarms, decrease in quality scores, etc. can be attributable to service code updates. Card ratings may be based on different information associated with the cards and can be computed based on: quality, availability, performance, revenue, compliance, operational risk, and any combination thereof. The data may be utilized by a scheduling component. In an embodiment, operational data 906 is ingested, scanned, or otherwise analyzed by the card quality registry to generate card ratings and includes, as an example, logging data of the performance of a card over time (e.g., before and after a deployment).

The library and/or service pipeline 908 may refer to a deployment pipeline for applying infrastructure changes—for example, security updates related to service components of a webpage, such as a JavaScript run-time system. In an embodiment, the library and/or service pipeline is used to generate updates to run-time system that are utilized by cards. In an embodiment, updates to the service code and updates to the client code of a card are performed separately—in other words, for a given deployment, the deployment may include a change to service code or cards code but not both. In an embodiment, alarms and monitors 910 may refer to software components that are associated with a production version of a card (e.g., incorporated as part of a webpage) and tracks whether there are issues related to the card that adversely affect user experience (e.g., crashes, degradation of performance). In an embodiment, the alarms and monitors 910 are implemented as notification events generated by a notification service.

If the system determines that a piece of code pushed by the service proves to be disruptive, the system can use blockers 914 that block the pipelines that didn't get to production by disabling the promotion. In an embodiment, the blocker 914 is a component of a computing resource service provider that has permissions and capabilities associated with assuming a role. The role can be given very specific permissions (e.g., an explicit permission to block a pipeline). In various embodiments, the role is utilized to obviate the need to have the service centralize admin rights. In an embodiment safety nets may be implemented so that a pipeline can be manually blocked—for example, a service developer may be aware that she is pushing risky code through the pipeline and manually blocks the final step so that the code is not automatically pushed to production until the developer manually allows for it.

The scheduling component may refer to a software component that is responsible to take decisions based on various metrics. Other components may include back-end and event controllers on the client-side that can decide on displaying the cards based on the other metrics, including compatibility information (e.g., a page cannot support a specific card). The on-boarding component may include executable code that, as a result of execution by one or more processors of a computer system, cause the computer system to create the card pipeline from a template, but it provides roles that ca be assumed in order to block a bad promotion. The on-boarding component can also set an internal pipeline to publish notification events 918 and enable system to subscribe to receive notifications based on those events. In an embodiment, the notification system is used to track the pipeline state and obviates the need to pull information on the pipeline state. The on-boarding component may further create pipeline triggers 912 that are used to promote a service change. The execution fleet 922 may refer to a managed service of a computing resource service provider that is used to facilitate the installation and operation of containers within a distributed system. In an embodiment, the execution fleet 922 can be implemented in accordance with the execution and/or routing layers as described in connection with FIG. 1.

The card builder and card deployment module 920 may be components created by the service which are controlled by the system. In some cases, it is possible for the whole pipeline to be bypassed to patch the cards base image as quickly as possible or if the customer would prefer to detect no events that they don't own in their pipeline.

In an embodiment, cards are created using templates provided by the service. In some cases, roles may be utilized to test the card service to assess if the cards are compliant with security, licensing, quality requirements, and also to provide library vendors visibility on their impact as well as a mechanism to block bad releases. The pipelines monitoring can include in tracking the build success, the test results, performance data, and more. An internal pipeline may emit a notification of an event.

Triggers 918 for merging-in service updates may be implemented in various ways. For example, an explicit trigger for cards pipelines may be utilized by using the release controller to trigger a notification event which was added as a source trigger in the service provider pipeline. The release controller may listen to the events bus on the card pipeline and card builder which is added as a custom step in the service provider pipeline will take the build task and use the latest service libraries. As an alternative embodiment, the card builder and card deployment module may be triggered by the release controller directly. In such an embodiment, the user pipeline may no longer reveal that a service update takes place and a new card image is produced from the same card source, but with different service binaries.

Figure 10:
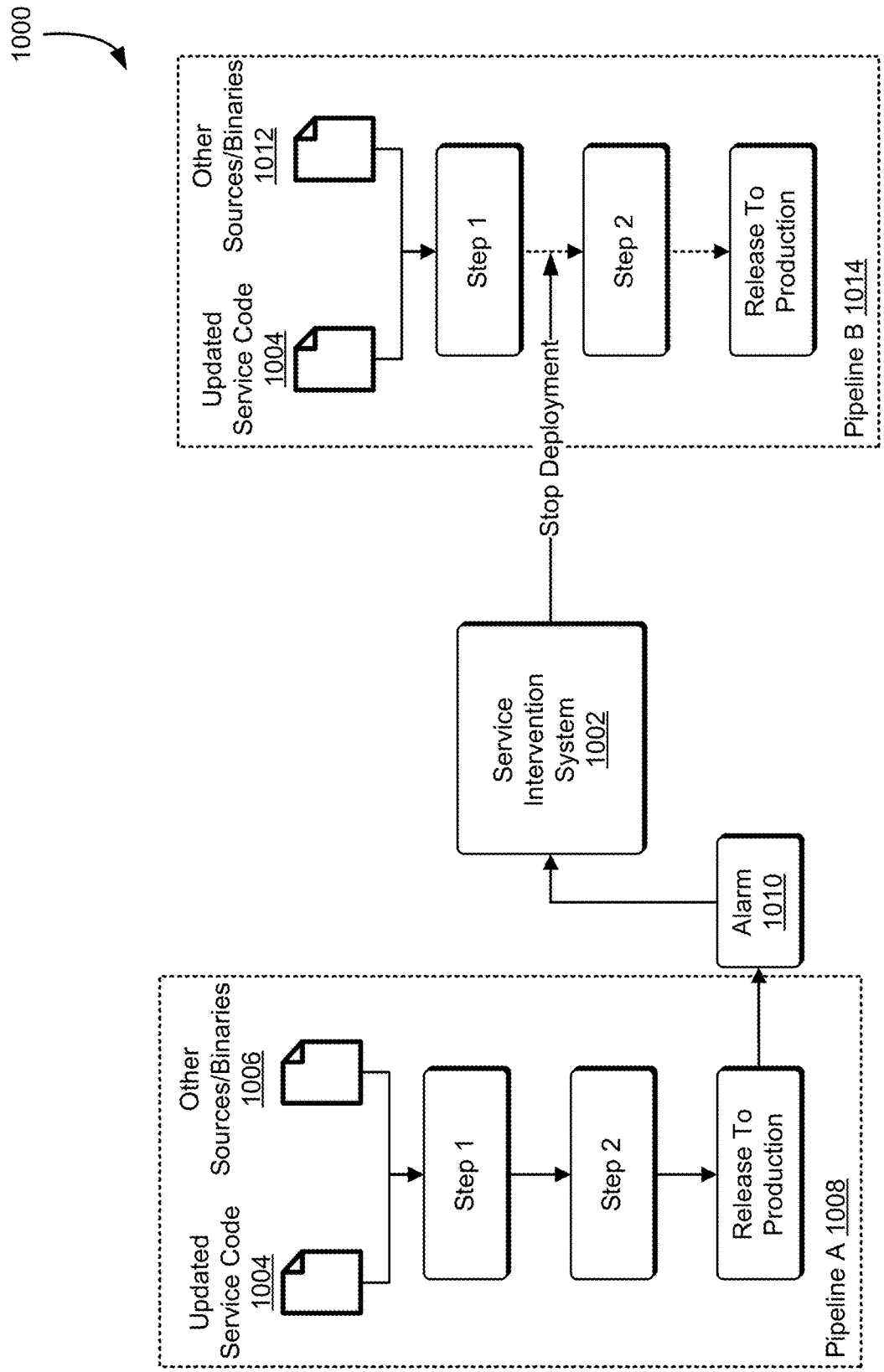
FIG. 10 illustrates a computing environment in which a service intervention system is usable to halt the deployment of a change to service code in one card pipeline in response to detecting an alarm signaled from the application of the change to a different card pipeline, according to at least one embodiment.

FIG. 10 illustrates a computing environment 1000 in which various embodiments may be practiced. The computing environment 1000 illustrates, according to at least one embodiment, a service intervention system 1002 that is usable to halt the deployment of a bad code change. The service intervention system 1002 may be implemented as software, hardware, or a combination thereof. In an embodiment, the service intervention system 1002 is implemented as (or as part of) a release controller, such as those described in connection with FIG. 9.

The computing environment 1000 illustrates an example in which a service change that is determined to have bad code during a deployment process is able to be rolled back and terminated across other pipelines. In an embodiment service code is updated (e.g., using a pipeline as described elsewhere in this disclosure) and executable code is generated. The updated service code may be the bad software 1004 illustrated in FIG. 10. However, at the outset, it may not be apparent—even after performing smoke testing, unit testing, and bake tests—that the software 1004 may have an adverse impact on clients' cards, as there may be hundreds, thousands, or even millions of different code branches and code paths that are exercised across what may be a large number of client cards. As such, it may be difficult to determine, a priori, the impact of a service change across the universe of existing cards.

In an embodiment, the other sources and binaries 1006 shown in FIG. 10 refers to the client code of a card that utilizes the updated service code. In an embodiment, the bad software 1004 and other source/binaries 1006 are pushed through a multi-step deployment of a first pipeline 1008 and is released to a production environment. In some cases, techniques described above may be utilized to limit the blast radius of the bad software, such as by utilizing a no-traffic and/or one-box rollout process.

Continuing with the example, the updated service code reaches a production environment and begins to adversely affect customer experience (e.g., degrades performance of websites that utilize the card associated with card of the pipeline 1008). As logging information is collected, an alarm 1010 may trigger a notification event that is pushed to the service intervention system. The service intervention system may determine, based on a drop in the quality score associated with the card, that the drop is attributable to the service code change and cause the deployment of the service code change to a second pipeline 1014 associated with a second card having a second set of sources and/or binaries 1012.

In the context of a computing resource service provider or, more generally, any suitable distributed system, the service/library update may be propagated across various card pipelines at various times. For example, in a computing resource service provider with limited resources, some card pipelines may be processed before others based on the availability of various computing resources becoming available. Thus, even in a batched deployment in which multiple card pipelines are assigned to the same batch, it may be the case that the application of a code update (e.g., service update) are not perfectly synchronized. As illustrated in FIG. 10, it may be the case that an alarm 1010 may be triggered by a first card pipeline 1008 that causes the service intervention system 1002 to stop the deployment in a second card pipeline 1014 that is still in the process of deploying the software 1004. In the example illustrated in FIG. 10, as indicated by the dotted line, the deployment of the bad software 1004 is stopped before the second card pipeline 1014 pushes the bad code to production. Accordingly, the service intervention system may improve the functionality of computer systems by preventing the release of harmful software to a customers of a computing resource service provider, thereby causing an improvement in one or more of the following aspects: security (e.g., preventing software that includes security vulnerability from being released); performance (e.g., preventing code with memory leaks or performance issues from being released); quality (e.g., preventing code with bugs that cause software features to break or behave in an unexpected manner from being released); and more.

Figure 11:
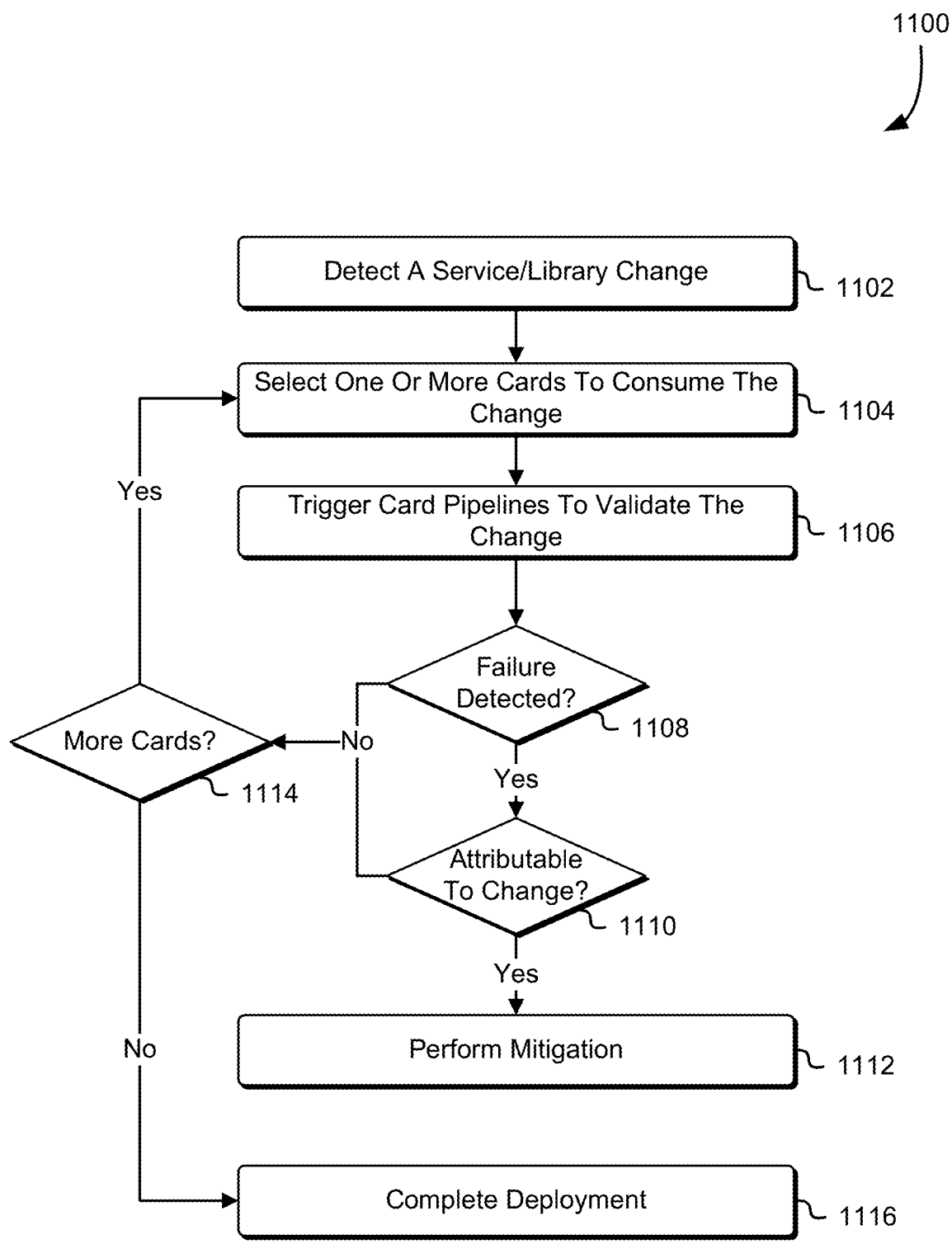
FIG. 11 illustrates a process for a batched deployment of a service and/or library component utilized by a plurality of cards, according to at least one embodiment.

FIG. 11 shows an illustrative example of a process 1100 for a batched deployment of a service and/or library component utilized by a plurality of cards, according to at least one embodiment. Some or all of the process 1100 (or any other processes described herein, or variations and/or combinations thereof) may be performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code may be stored on a computer-readable storage medium, for example, in the form of a computer program comprising a plurality of computer-readable instructions executable by one or more processors.

The system performing the process 1100 may be any suitable computer system, such as the release controller and/or the service intervention system described in connection with FIGS. 9 and 10, respectively. The system may detect 1102 a service and/or library change wherein the service and/or library component is utilized by a plurality of cards. As described above, a card may include code (e.g., source code, executable code, a combination thereof) and a run-time system. The service and/or library change may be a change to the run-time system, such as a software patch that may improve the operation of the computer system by delivering security updates, performance enhancements, bug fixes, and more. The change to the service component may be detected by, for example, receiving a notification from a notification system that is emitted by a pipeline associated with the service and/or library component. Such a pipeline may be a code pipeline. The system may subscribe to change notifications by submitting an API request to a notification service, and the notification service may push change notifications to subscribed clients via a notification framework and a client library running on subscribing clients. In some embodiments, either an alarm/monitor or a trigger from a service/library pipeline can be detected as part of this step.

The system may select 1104 one or more card to consume the detected service and/or library change. In an embodiment, the change refers to a change to source code associated with a service/library component that triggers a service/library pipeline to compile the source code, thereby generating executable code that can be tested and validated in a controlled environment. However, it should be noted that the testing of the service/library code may not exhaustively verify every code branch and ever set of parameters to verify functionality of the service/library code under all circumstances. Accordingly, even though various service tests may be verified when the service/library change progresses through the service/library pipeline, the service/library pipeline may not necessarily provide assurances that deployed cards are affected by the service and/or library change. In an embodiment, the one or more cards are selected based on the quality scores associated with the cards (e.g., changes are rolled out to cards with higher quality scores first), based on a random or pseudorandom process, or a combination thereof.

In an embodiment, the system selects the one or more cards to consume the service/library change based on quality scores associated with the cards. Card quality scores may be referred to as card ratings and may be calculated based on different information associated with the cards including but not limited to: quality, availability, performance, revenue, compliance, operational risk, and any combination thereof. In an embodiment, the system selects, from a plurality of cards, a subset of the cards that have the highest quality scores recorded over time.

The system may trigger 1106 card pipelines to validate the changes. In an embodiment, the card pipelines are in accordance with those described elsewhere in this disclosure. The system performing the process (e.g., release controller) may include computer-executable code that, as a result of execution by one or more processors of a computer system, causes the computer system to separate the deployment of card and service changes. Mixing customer code changes (e.g., to a card) with a service/library change increases entropy and both changes may introduce separate impacts. In an embodiment, the system triggers a separate release that is 100% correlated to the service/library change by holding the card change until the system is able to verify the service/library change. In an embodiment, the system uses a card pipeline of a selected card to generate a quality score that is compared against the previous quality score, thereby comparing the quality metrics of a particular card pipeline before and after the service/library change. By using high quality cards in the first batch, the system may be better able to attribute failures and other issues (e.g., degradation in performance) to the service change. Card pipelines may be triggered in the manner described above in the manner described above, such as in accordance with embodiments described in connection with FIGS. 1-7. Multiple card pipelines may be triggered to execute tests and/or deployments in parallel.

In an embodiment, the system determines whether 1108 a failure occurred. A failure may refer to a unit test failing, performance metrics exceeding a certain threshold (e.g., an increase of more than X % response time), compatibility issues between the service and card, and more. If there is a failure, the system may further determine whether 1110 the failure is attributable to the service/library change. In an embodiment, the failure is determined on a relative basis, such as by determining a difference in the pass rate between the card with the previous version of the service and the version of the service being deployed. In some cases, the detection of a failure causes the pipeline to be temporarily blocked until a command is received (e.g., from a developer via a developer computing device) that indicates to continue the pipeline. The developer may inspect logs, performance data, and test results to determine whether to attribute a failure to the service change and issue a command (e.g., via a command-line interface) that attributes the failure to the change or to not attribute the failure to the change.

If a failure is detected and is attributable to the service/library change, the system may perform 1112 a mitigation. For example, the mitigation may be to halt and/or roll back the change in the card pipeline. In some cases, such as where a critical test failure has occurred, the system may also rollback other card pipelines that the change is being deployed to in parallel. In some cases, the mitigation is to pause execution of the card pipeline to allow for developers to examiner and/or debug the computing environment and perform a more thorough root cause analysis of the failure.

If no failures are detected and/or no failures are attributable to the service/library change, the system may continue to roll out the change to an additional set of cards in the plurality of cards. For example, in a batched deployment, the system may determine whether 1114 more the service/library change is to be deployed to more cards. For example, quality metrics collected just prior to the service change may be utilized to select the top 1% of cards (e.g., out of 1000 cards, the 10 cards with the highest quality scores are selected) and validate the service change against those cards before deploying to a broader set of cards—for example, in a first stage, the service change may be rolled out to the top 1% of cards, upon validating the change against the top 1% of cards, then roll out the change to the top 10% of cards, and then finally to all cards. The deployment may be completed 1116, which may include additional tests and/or bake time to ensure the deployment has not caused a negative impact on availability of the cards in response to client requests.

Figure 12:
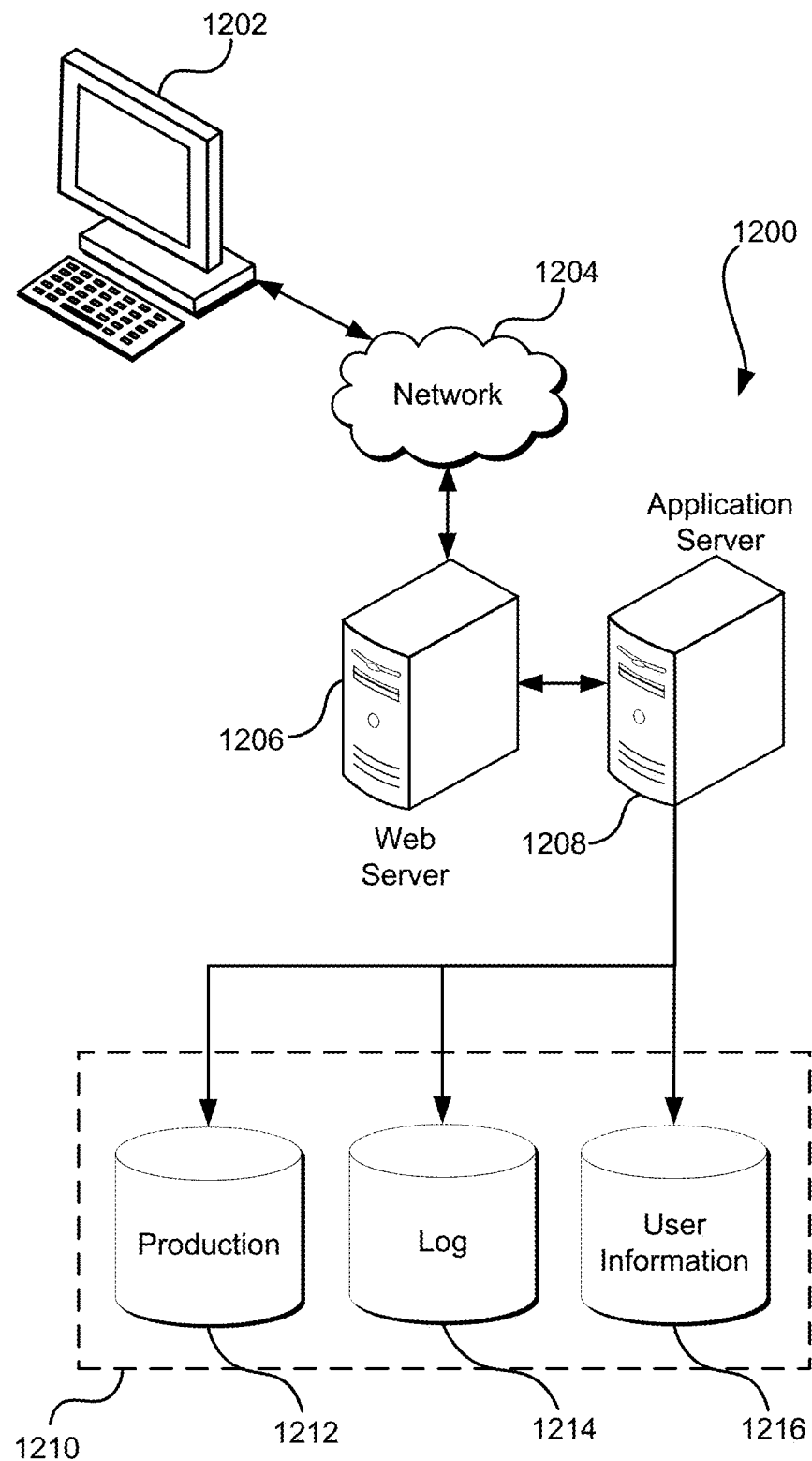
FIG. 12 illustrates a system in which various embodiments can be implemented.

FIG. 12 illustrates aspects of an example system 1200 for implementing aspects in accordance with an embodiment. As will be appreciated, although a web-based system is used for purposes of explanation, different systems may be used, as appropriate, to implement various embodiments. In an embodiment, the system includes an electronic client device 1202, which includes any appropriate device operable to send and/or receive requests, messages, or information over an appropriate network 1204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. In an embodiment, communication over the network is enabled by wired and/or wireless connections and combinations thereof. In an embodiment, the network includes the Internet and/or other publicly-addressable communications network, as the system includes a web server 1206 for receiving requests and serving content in response thereto, although for other networks an alternative device serving a similar purpose could be used as would be apparent to one of ordinary skill in the art.

In an embodiment, the illustrative system includes at least one application server 1208 and a data store 1210 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1202 and the application server 1208, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 1210, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1212 and user information 1216, which are used to serve content for the production side. The data store also is shown to include a mechanism for storing log data 1214, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1210.

The data store 1210, in an embodiment, is operable, through logic associated therewith, to receive instructions from the application server 1208 and obtain, update or otherwise process data in response thereto and the application server 1208 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1202. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1200 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1200, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C # or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Embodiments of the disclosure can be described in view of the following clauses:

1. A computer-implemented method, comprising:
   detecting a condition indicating a change to one or more deployment parameters, wherein the one or more deployment parameters are associated with a production computing environment configured to route customer requests to a first set of computing resources for fulfillment;

provisioning, according to the one or more deployment parameters, a second set of computing resources, wherein the second set of computing resources is accessible via an endpoint;

utilizing the endpoint to execute tests using the second set of computing resources; and in response to validating that the tests passed:
  provisioning additional computing resources according to the changed one or more deployment parameters; and
  configuring the production computing environment to route at least a portion of the customer requests to the additional computing resources.

2. The computer-implemented method of claim 1, further comprising, in response to configuring the production computing environment to route at least the portion of the customer requests to the additional computing resources:

validating a set of quality metrics associated with the production computing environment; and configuring at least part of the first set of computing resources according to the changed one or more deployment parameters.

3. The computer-implemented method of claim 2, wherein configuring at least part of the first set of computing resources according to the changed one or more parameters includes configuring the first set of computing resources.

4. The computer-implemented method of claim 1, wherein the condition is detected based on submission of a command-line interface (CLI) command.

5. A system, comprising at least one computing device configured to implement one or more services, wherein the one or more services:

detect a change to one or more deployment parameters associated with a computing environment that uses a first set of computing resources to fulfill customer requests;

configure a second set of computing resources according to the changed one or more deployment parameters, wherein the second set of computing resources is accessible via an endpoint;

use the endpoint to validate a state of the second set of computing resources; and in response to validating the state, cause at least a portion of the customer requests to be routed to the second set of computing resources, thereby enabling the second set of computing resources to be used to fulfill the at least portion of the customer requests.

6. The system of claim 5, wherein the one or more services are further configured to, in response to failing to validate the state, configure the first set of computing resources according to the unchanged one or more deployment parameters.

7. The system of claim 5, wherein change to the one or more deployment parameters includes a change to source code utilized to fulfill the customer requests.

8. The system of claim 5, wherein the one or more services are further configured to, in response to having caused the computing environment to use the second set of computing resources to fulfill at least part of the customer requests, de-provision resources of the first set of computing resources.

9. The system of claim 5, wherein the second set of computing resources comprises a container.

10. The system of claim 5, wherein the endpoint is inaccessible to customer computing devices that submit at least some of the customer requests.

11. The system of claim 5, wherein the one or more services are configured to, in response to validating the state, further cause the computing environment to use first set of the computing resources to fulfill other requests of the customer requests.

12. The system of claim 5, wherein the deployment trigger is detected based on an internal pipeline trigger.

13. A non-transitory computer-readable storage medium having stored thereon executable instructions that, as a result of being executed by one or more processors of a computer system, cause the computer system to at least:

detect a trigger associated with a computing environment that uses a first set of computing resources to fulfill customer requests;

configure, based on the trigger, a second set of computing resources, wherein the second set of computing resources is accessible via an endpoint;

run, via the endpoint, one or more tests on the second set of computing resources; and in response to determining the one or more tests passed, shift network traffic from the first set of computing resources to the second set of computing resources, thereby enabling the second set of computing resources to be used to fulfill at least a portion of the customer requests.

14. The non-transitory computer-readable storage medium of claim 13, wherein the instructions further comprise instructions that, as a result of being executed by the one or more processors, cause the computer system to, in response to determining the one or more tests or alarms failed, to perform a rollback of changes indicated by the deployment trigger.

15. The non-transitory computer-readable storage medium of claim 13, wherein the instructions to configure the second set of computing resources include instructions that cause customer requests to be routed away from the second set of resources.

16. The non-transitory computer-readable storage medium of claim 13, wherein the instructions further cause the computer system to:

generate one or more metrics of the computing environment based on the fulfillment of the customer requests by the first set of computing resources and the second set of computing resources; and based on the one or more metrics satisfying a set of conditions, shifting usage of the first set of computing resources to the second set of computing resources.

17. The non-transitory computer-readable storage medium of claim 13, wherein the instructions to determine that the one or more tests passed include instructions to determine that a threshold pass rate was exceeded.

18. The non-transitory computer-readable storage medium of claim 13, wherein the instructions to determine that the one or more tests passed include instructions to verify operation of the second set of computing resources over a predetermined period of time.

19. The non-transitory computer-readable storage medium of claim 13, wherein the instructions to detect the trigger include instructions that cause the computer system to receive an event from a notification system, wherein the event encodes a change to one or more deployment parameters.

20. The non-transitory computer-readable storage medium of claim 13, wherein the second set of computing resources comprises a container.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    detecting a change to a service component utilized by a plurality of cards, a card of the plurality of cards comprising a run-time system and code, wherein the card is associated with a first quality score based on operation of the card with the service component;
    selecting the card from the plurality of cards;
    triggering a first pipeline associated with the card to cause one or more computing resources to execute tests to produce a second quality score; and
    in response to attributing a test failure to the change to the service component based on the first quality score and the second quality score, halting a second pipeline associated with a second card of the plurality of cards.

2. The computer-implemented method of claim 1, wherein halting the second pipeline comprises:
    assuming a role associated with a set of permissions, wherein the set of permissions are sufficient to control deployment of the second pipeline; and
    causing, under the assumed role, the deployment of the second pipeline to be blocked.

3. The computer-implemented method of claim 1, further comprising rolling back the change to the service component.

4. A system, comprising at least one computing device implementing one or more services, wherein the one or more services:
    detect a change to a service component utilized by a plurality of cards, a card of the plurality of cards comprising a run-time system and code, wherein the card is associated with a first quality metric;
    trigger a first pipeline associated with the card to cause one or more computing resources to execute tests to produce a second quality; and
    in response to attributing a failure to the change to the service component based on the first quality metric and the second quality metric, halting a second pipeline associated with a second card of the plurality of cards.

5. The system of claim 4, wherein the instructions to detect the change to the service component include instructions that cause the system to detect a notification indicating the change to the service component.

6. The system of claim 4, wherein attributing the failure to the change comprises comparing the first quality metric associated with operation of the card and the service component with the second quality metric associated with operation of the card and the change to the service component.

7. The system of claim 6, wherein the first and second quality metrics are associated with performance of the card.

8. The system of claim 4, wherein the one or more resources comprises a container.

9. The system of claim 4, wherein halting the second pipeline comprises causing a notification to be emitted to another system that is operable to manage the one or more computing resources.

10. The system of claim 4, wherein the code is source code.

11. The system of claim 4, wherein the run-time is a JavaScript run-time.

12. A non-transitory computer-readable storage medium having stored thereon executable instructions that, as a result of being executed by one or more processors of a computer system, cause the computer system to at least:
    detect a change to service code utilized by a plurality of cards, a card of the plurality of cards comprising a run-time system and code, wherein the card is associated with a first quality score based on operation of the card with the service code;
    select the card from the plurality of cards;
    trigger a first pipeline associated with the card to cause one or more computing resources to execute tests to produce a second quality score; and
    in response to attributing a test failure to the change to the service code based on the first quality score and the second quality score, halt a second pipeline associated with a second card of the plurality of cards.

13. The non-transitory computer-readable storage medium of claim 12, wherein the instructions further cause the system to:
    assume a role associated with a set of permissions, wherein the set of permissions are sufficient to control deployment of the second pipeline; and
    block the deployment of the second pipeline under the assumed role.

14. The non-transitory computer-readable storage medium of claim 12, wherein the instructions to trigger the first pipeline to cause the one or more computing resources to execute the tests are executed by the one or more processors in response to receiving a command from a client computing device.

15. The non-transitory computer-readable storage medium of claim 12, wherein the instructions further cause the system to select the card from the plurality of cards based on the first quality score associated with the card.

16. The non-transitory computer-readable storage medium of claim 12, wherein the first quality score is based on one or more operational metrics associated with the card.

17. The non-transitory computer-readable storage medium of claim 16, wherein the one or more operational metrics include availability of the card in response to one or more client requests.

18. The non-transitory computer-readable storage medium of claim 12, wherein the code is executable code.

19. The non-transitory computer-readable storage medium of claim 12, wherein attributing the test to the change to the service code is based on a decrease in first quality score.

* * * * *